(12) United States Patent
Ahn et al.

(10) Patent No.: US 7,425,508 B2
(45) Date of Patent: Sep. 16, 2008

(54) LIQUID CRYSTAL DISPLAY DEVICE AND FABRICATING METHOD THEREOF, AND THIN FILM PATTERNING METHOD APPLIED THERETO

(75) Inventors: Byung Chul Ahn, Anyang-si (KR); Joo Soo Lim, Gumi-si (KR); Ji No Lee, Goyang-si (KR); Hee Young Kwack, Seoul (KR)

(73) Assignee: LG Display Co., Ltd., Seoul (KR)

( * ) Notice: Subject to any disclaimer, the term of this patent is extended or adjusted under 35 U.S.C. 154(b) by 179 days.

(21) Appl. No.: 11/292,059

(22) Filed: Dec. 2, 2005

(65) Prior Publication Data

US 2006/0138428 A1    Jun. 29, 2006

(30) Foreign Application Priority Data

Dec. 24, 2004    (KR)    ............... 10-2004-0112582

(51) Int. Cl.
    *H01L 21/311*    (2006.01)
(52) U.S. Cl. .............. 438/694; 438/699; 438/942; 438/946; 257/E21.023
(58) Field of Classification Search ............ 438/694, 438/699, 942, 946
    See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 2005/0041187 A1* | 2/2005 | Song et al. | ........... 349/139 |

* cited by examiner

*Primary Examiner*—Wai-Sing Louie
(74) *Attorney, Agent, or Firm*—McKenna, Long & Aldridge LLP

(57) ABSTRACT

A liquid crystal display device, including: a gate line on a substrate; a data line crossing the gate line with a gate insulating film therebetween to define a pixel area; a thin film transistor connected to the gate line and the data line; a semiconductor pattern which forms a channel of the thin film transistor and overlaps along the data line; a passivation film covering the data line and the thin film transistor; and a pixel electrode on the gate insulating film in a pixel hole of the pixel area that penetrates the passivation film and connected to the thin film transistor, the pixel electrode on an inclined side surface of the passivation film to encompass the pixel hole, to form a border with the passivation film and having a thickness that decreases as it goes up the side surface of the passivation film.

17 Claims, 22 Drawing Sheets

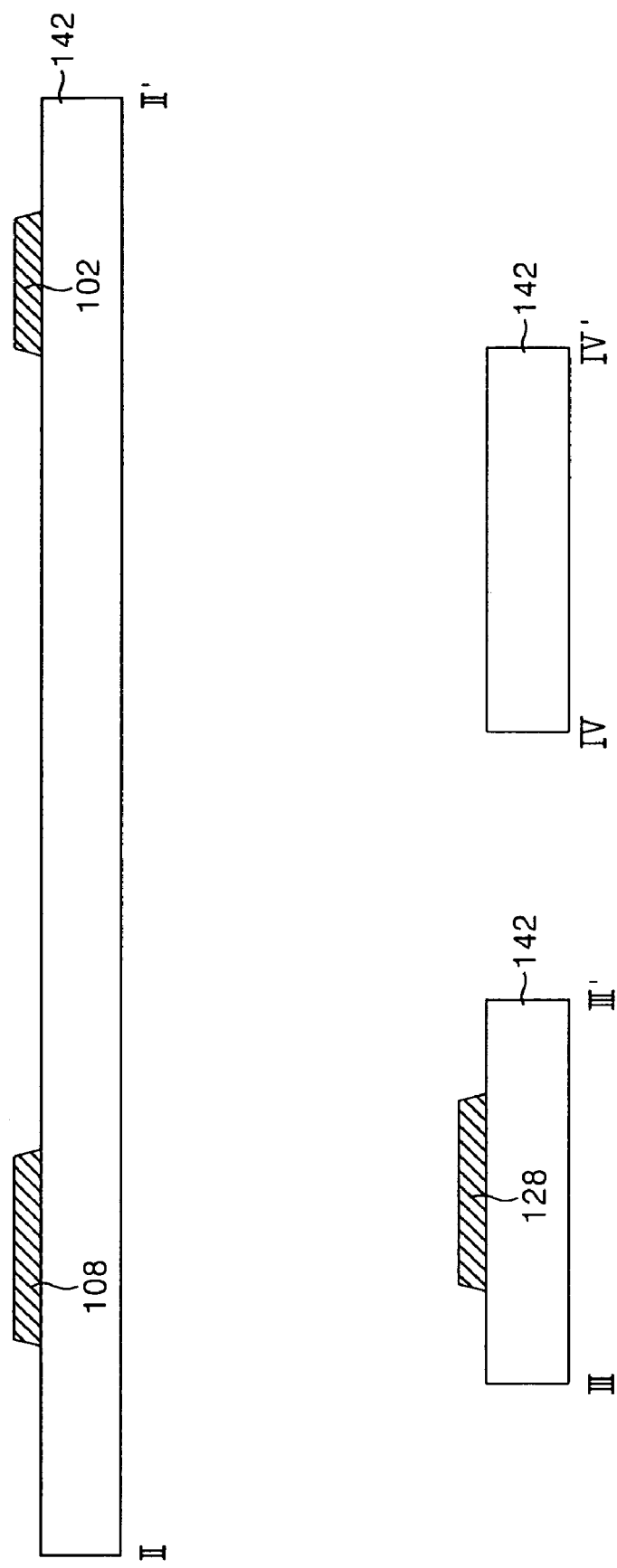

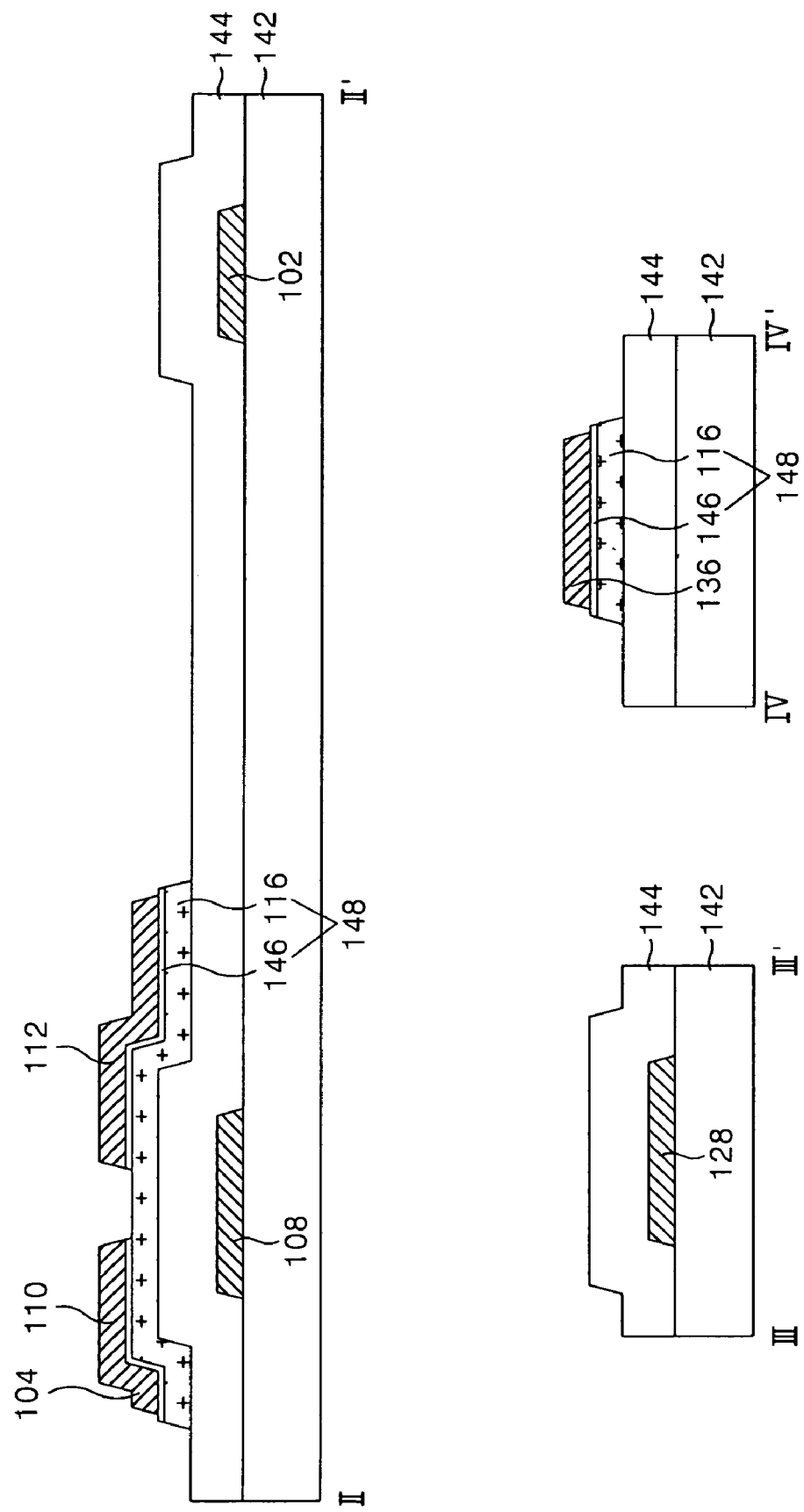

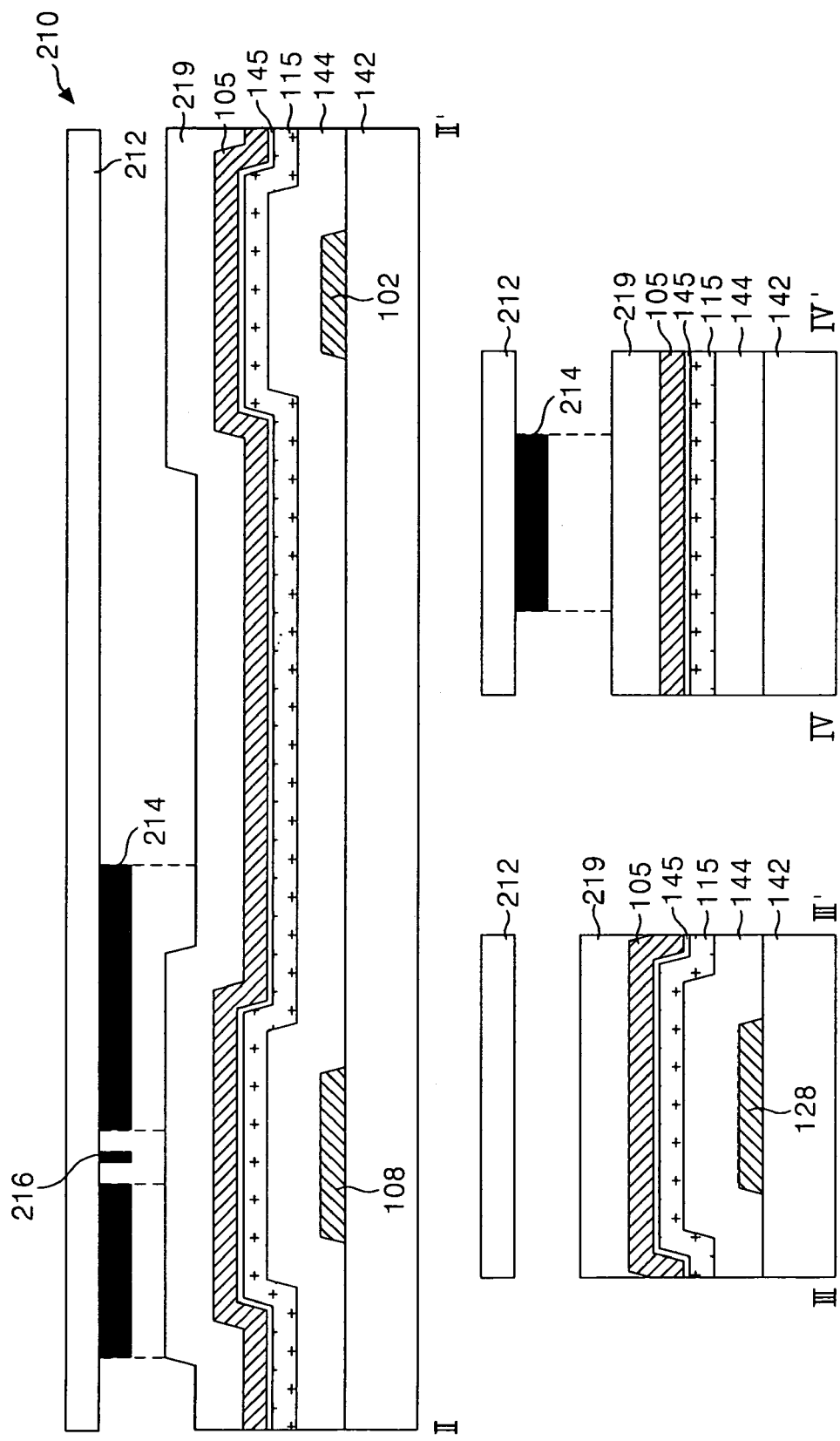

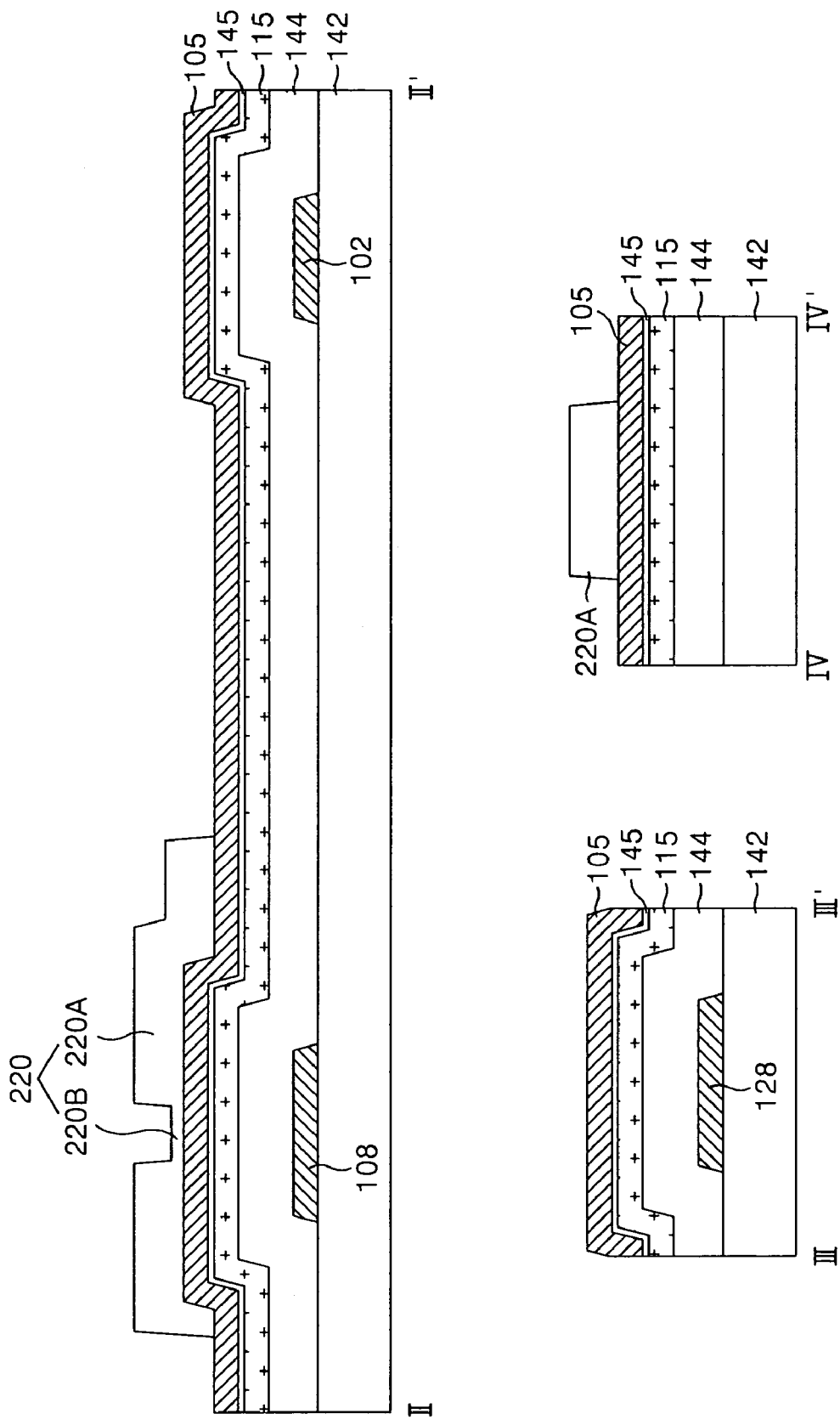

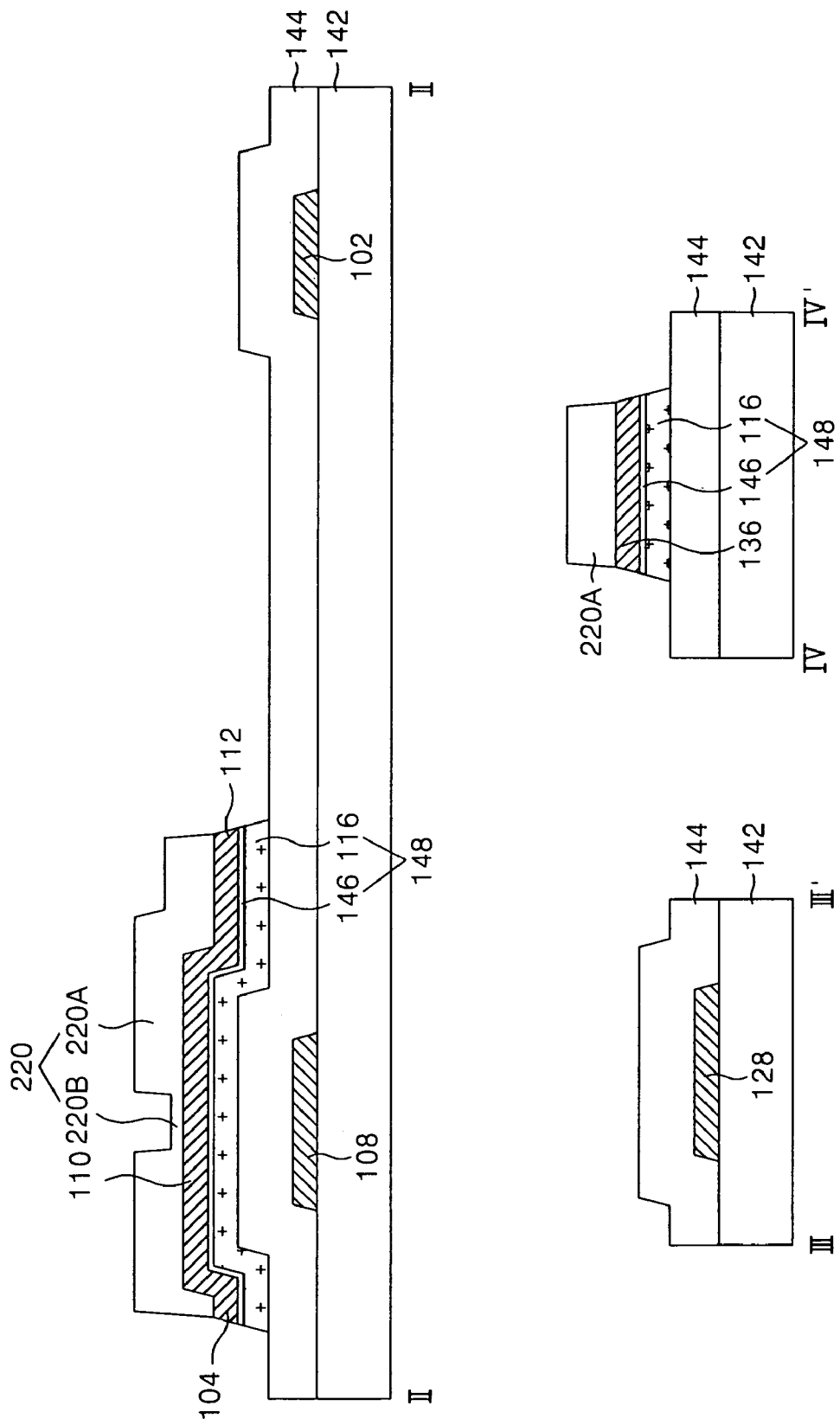

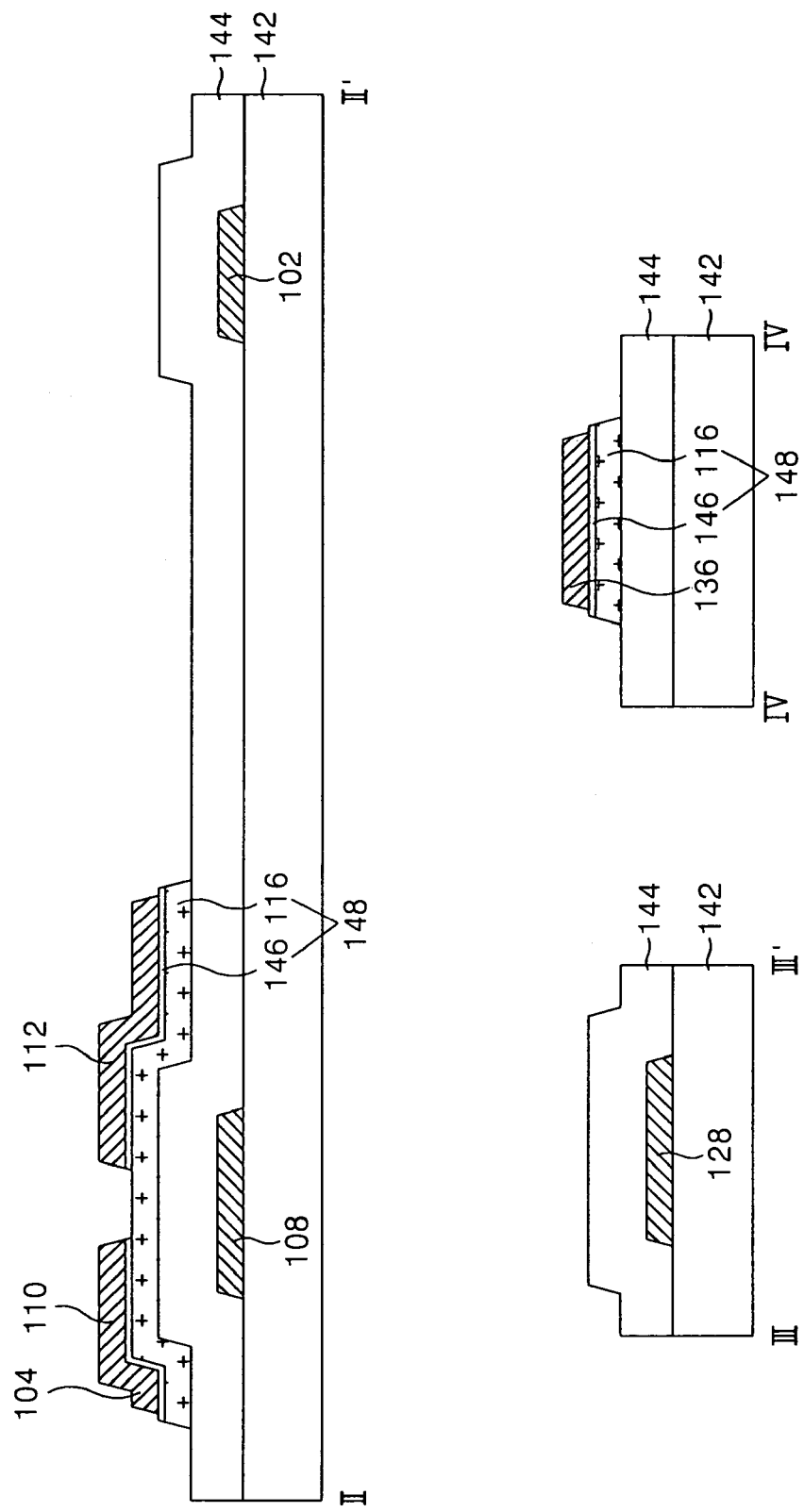

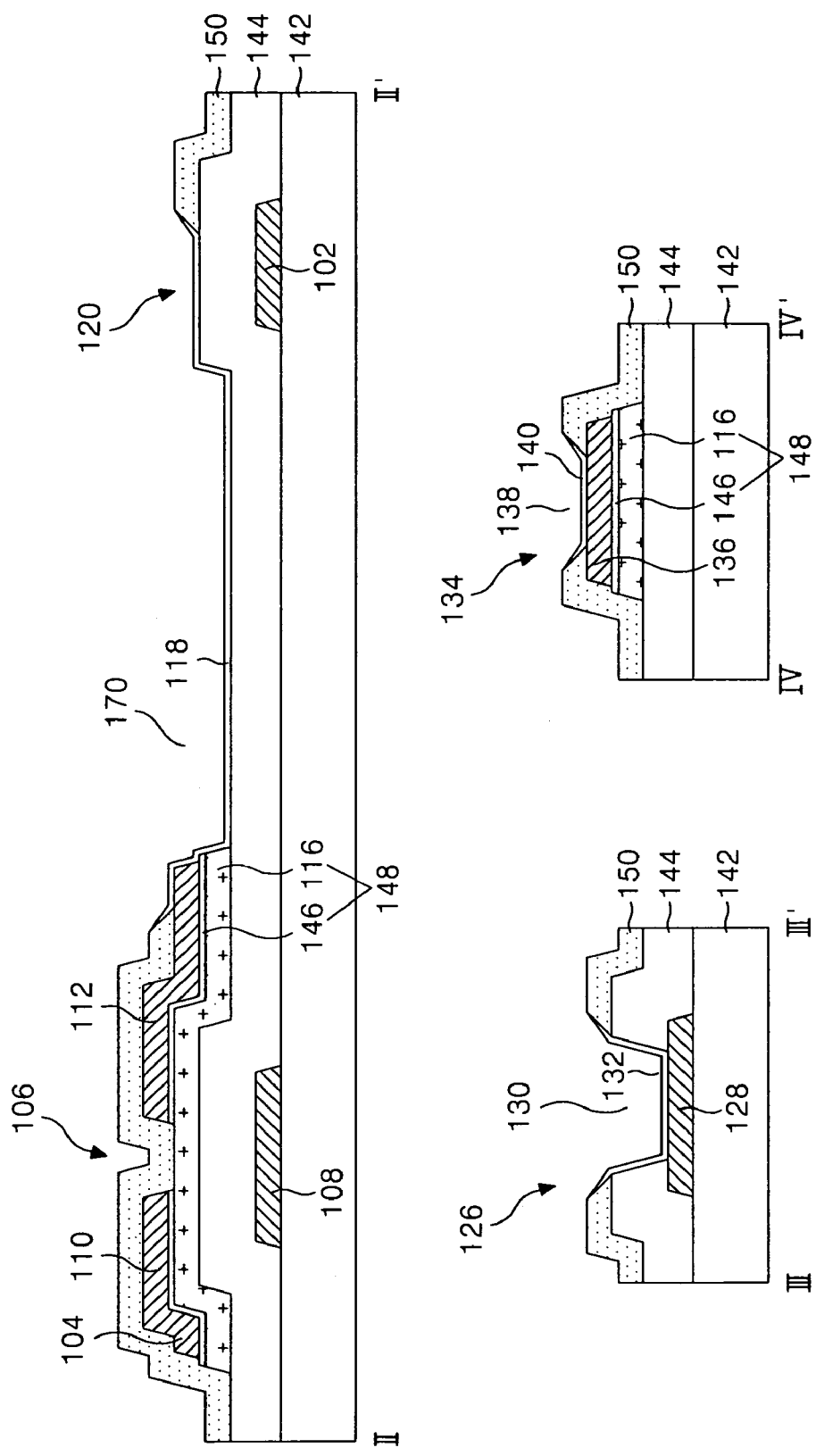

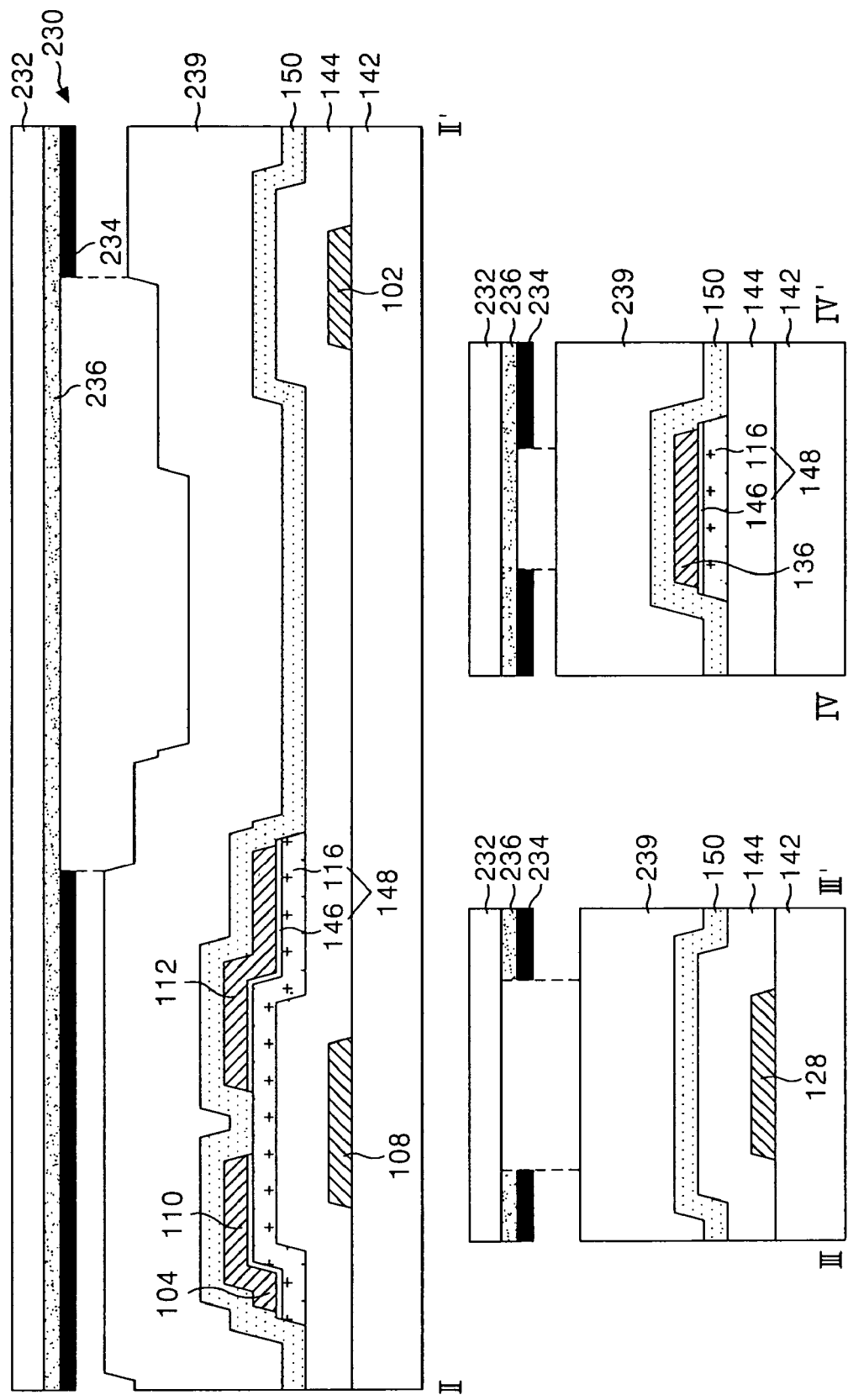

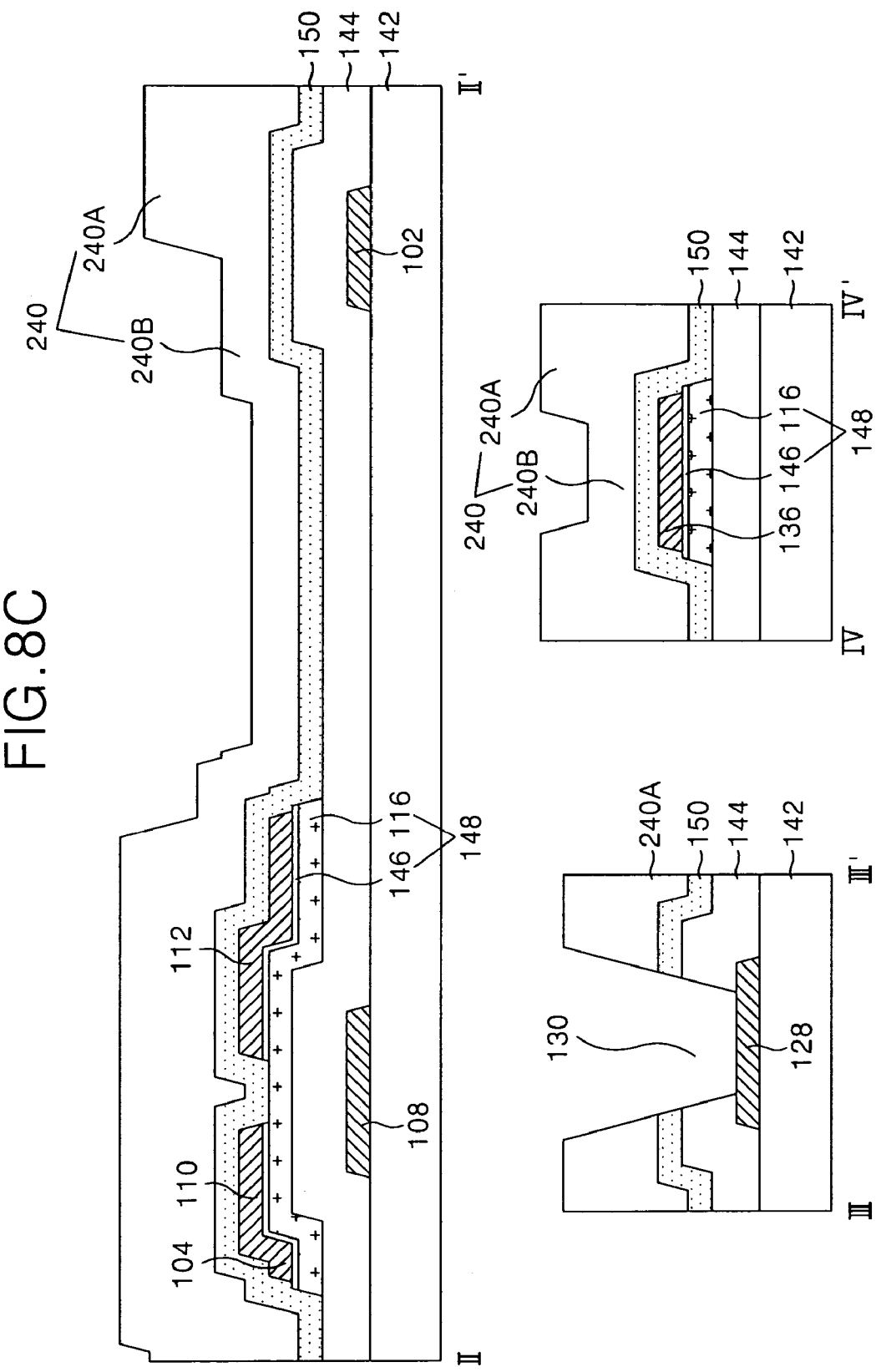

# LIQUID CRYSTAL DISPLAY DEVICE AND FABRICATING METHOD THEREOF, AND THIN FILM PATTERNING METHOD APPLIED THERETO

This application claims the benefit of the Korean Patent Application No. P2004-112582 filed on Dec. 24, 2004, which is hereby incorporated by reference for all purposes as if fully set forth herein.

BACKGROUND OF THE INVENTION

1. Field of the Invention

The present invention relates to a liquid crystal display device and a fabricating method thereof, and more particularly to a thin film transistor substrate using a simplified fabrication process and a thin film patterning method applied thereto.

2. Discussion of the Related Art

A liquid crystal display device controls the light transmittance of a liquid crystal having a dielectric anisotropy using an electric field to display a picture. The liquid crystal display device includes a liquid crystal display panel displaying a picture using a liquid crystal cell matrix, and a drive circuit driving the liquid crystal display panel.

Referring to FIG. 1, a liquid crystal display panel of the related art includes a color filter substrate 10 and a thin film transistor substrate 20 that are bonded together with a liquid crystal 24 therebetween.

The color filter substrate 10 includes a black matrix 4, a color filter 6, and a common electrode 8 which are sequentially formed on an upper glass substrate 2. The black matrix 4 is formed in a matrix pattern on the upper glass substrate 2. The black matrix 4 divides an area of the upper glass substrate into a plurality of cell areas where the color filter is to be formed, and prevents light interference between adjacent cells and a reflection of external light. The color filter 6 is divided into red R, green G, and blue B areas in the individual cell areas to each transmit the red, green, and blue light. The common electrode 8 is formed of a transparent conductive layer formed over the entire surface of the color filter 6 to supply a common voltage Vcom that is fixed when driving the liquid crystal 24. In order to level the color filter 6, an overcoat layer (not shown) is formed between the color filter 6 and the common electrode 8.

The thin film transistor substrate 20 includes a thin film transistor 18 and a pixel electrode 22 which are in each cell area that are defined by crossing the gate line 14 and the data line 16 on a lower glass substrate 12. The thin film transistor 18 supplies a data signal from the data line 16 to the pixel electrode 22 in response to a gate signal from the gate line 12. The pixel electrode 22 formed of the transparent conductive layer supplies the data signal from the thin film transistor 18 to drive the liquid crystal 24.

The liquid crystal 24 having dielectric anisotropy rotates in accordance with an electric field generated by the data signal on the pixel electrode 22 and the common voltage Vcom on the common electrode 8 to control the light transmittance, thereby realizing a desired gray level.

The liquid crystal display panel further includes a spacer (not shown) to uniformly maintain a cell gap between the color filter substrate 10 and thin film transistor substrate 20. A ball spacer or a column spacer may be used as the spacer.

The color filter substrate 10 and the thin film transistor substrate 20 of the liquid crystal display panel are formed using a plurality of mask processes. One mask process includes a plurality of processes such as a thin film deposition (coating) process, a cleaning process, a photolithography process (hereinafter, referred to as "photo process"), an etching process, a photo-resist peeling process, and an inspection process.

Specifically, fabrication of the thin film transistor substrate includes a semiconductor process and requires a plurality of mask processes. Thus, its fabrication process is complicated, and it is a major portion of the manufacturing cost of the liquid crystal display panel. Accordingly, a thin film transistor substrate has been developed to reduce the number of mask processes from five mask processes that were typical.

SUMMARY OF THE INVENTION

Accordingly, the present invention is directed to a liquid crystal display device and fabricating method thereof, and thin film patterning method applied thereto that substantially obviates one or more of the problems due to limitations and disadvantages of the related art.

An advantage of the present invention is to provide a liquid crystal display device that simplifies the manufacturing process and fabricating method thereof, and a thin film patterning method applied thereto.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, including: a gate line on a substrate; a data line crossing the gate line with a gate insulating film therebetween to define a pixel area; a thin film transistor connected to the gate line and the data line; a semiconductor pattern which forms a channel of the thin film transistor and overlaps along the data line; a passivation film covering the data line and the thin film transistor; and a pixel electrode on the gate insulating film in a pixel hole of the pixel area that penetrates the passivation film and connected to the thin film transistor, the pixel electrode on an inclined side surface of the passivation film to encompass the pixel hole, to form a border with the passivation film and having a thickness that decreases as it goes up the side surface of the passivation film.

In another aspect of the present invention, a liquid crystal display device, including: a gate line and a data line crossing each other with a gate insulating film therebetween to define a pixel area; a thin film transistor connected to the gate line and the data line; a pixel electrode on the gate insulating film of the pixel area connected to the thin film transistor; and a passivation film on the gate insulating film except where the pixel electrode is formed to form a border with the pixel electrode.

In another aspect of the present invention, a method of fabricating a liquid crystal display device, including: a first mask process of forming a gate line on a substrate and a gate electrode connected to the gate line; a second mask process of forming a gate insulating film covering the gate line and the gate electrode, a semiconductor pattern on the gate insulating film, a data line crossing the gate line on the semiconductor pattern to define a pixel area, a source electrode connected to the data line, and a drain electrode facing the source electrode; a third mask process of forming a passivation film covering the data line, the source electrode and the drain electrode, and forming a pixel hole which penetrates the passivation film in the pixel area and forming a pixel electrode in the pixel hole connected to the drain electrode, the pixel electrode formed on a side surface of the passivation film to encompass the pixel hole, to form a border with the passivation film, and having its thickness decrease as it goes up on the side surface of the passivation film.

In another aspect of the present invention, a method of fabricating a liquid crystal display device, including: forming a gate line and a data line crossing each other with a gate insulating film therebetween to define a pixel area, and a thin film transistor connected to the gate line and the data line; forming a passivation film on the substrate; forming a photo-resist pattern on the passivation film; patterning the passivation film by a wet etching using the photo-resist pattern as a mask; forming a transparent conductive film on the substrate; and forming a pixel electrode by patterning the transparent conductive film by removing the photo-resist pattern where the transparent conductive film is formed, wherein the pixel electrode is formed on the gate insulating film and connected to the thin film transistor.

In another aspect of the present invention, a method of patterning thin films, including: forming a first thin film on a substrate; forming a photo-resist pattern on the first thin film; over-etching the exposed first thin film through the photo-resist pattern by a wet etching; forming a second thin film covering the photo-resist pattern; and patterning the second thin film by removing the photo-resist pattern where the second thin film is formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A and 4B are a plan view and a sectional diagram showing a first mask process of the thin film transistor substrate according to an embodiment of the present invention;

FIGS. 5A and 5B are a plan view and a sectional diagram showing a second mask process of the thin film transistor substrate according to an embodiment of the present invention;

FIGS. 7A and 7B are a plan view and a sectional diagram showing a third mask process of the thin film transistor substrate according to an embodiment of the present invention;

DETAILED DESCRIPTION OF THE ILLUSTRATED EMBODIMENT

Reference will now be made in detail to the preferred embodiments of the present invention, examples of which are illustrated in the accompanying drawings.

With reference to FIGS. 2 to 10, embodiments of the present invention will be explained as follows.

Figure 1:
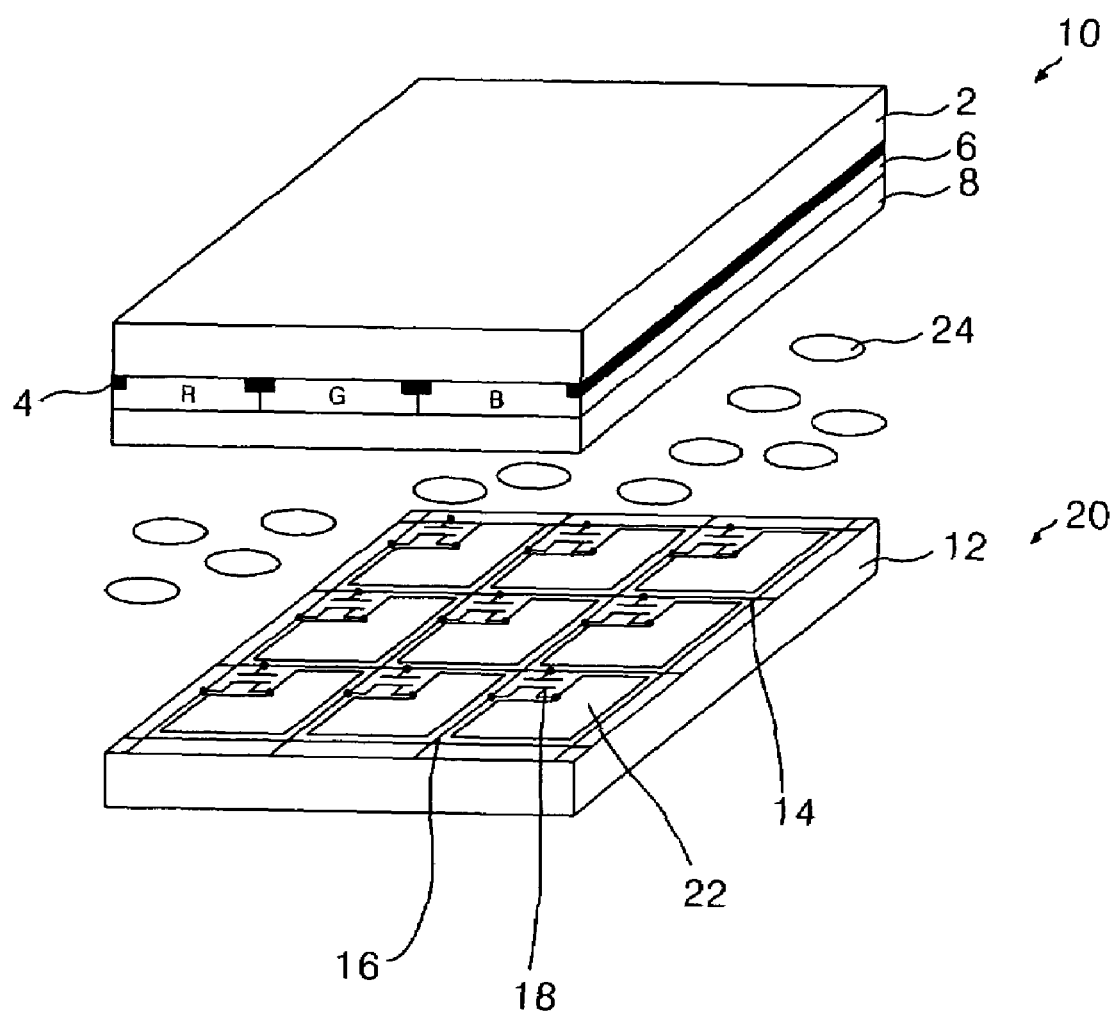
FIG. 1 is a perspective view illustrating a liquid crystal display panel structure of the related art.
Figure 2:
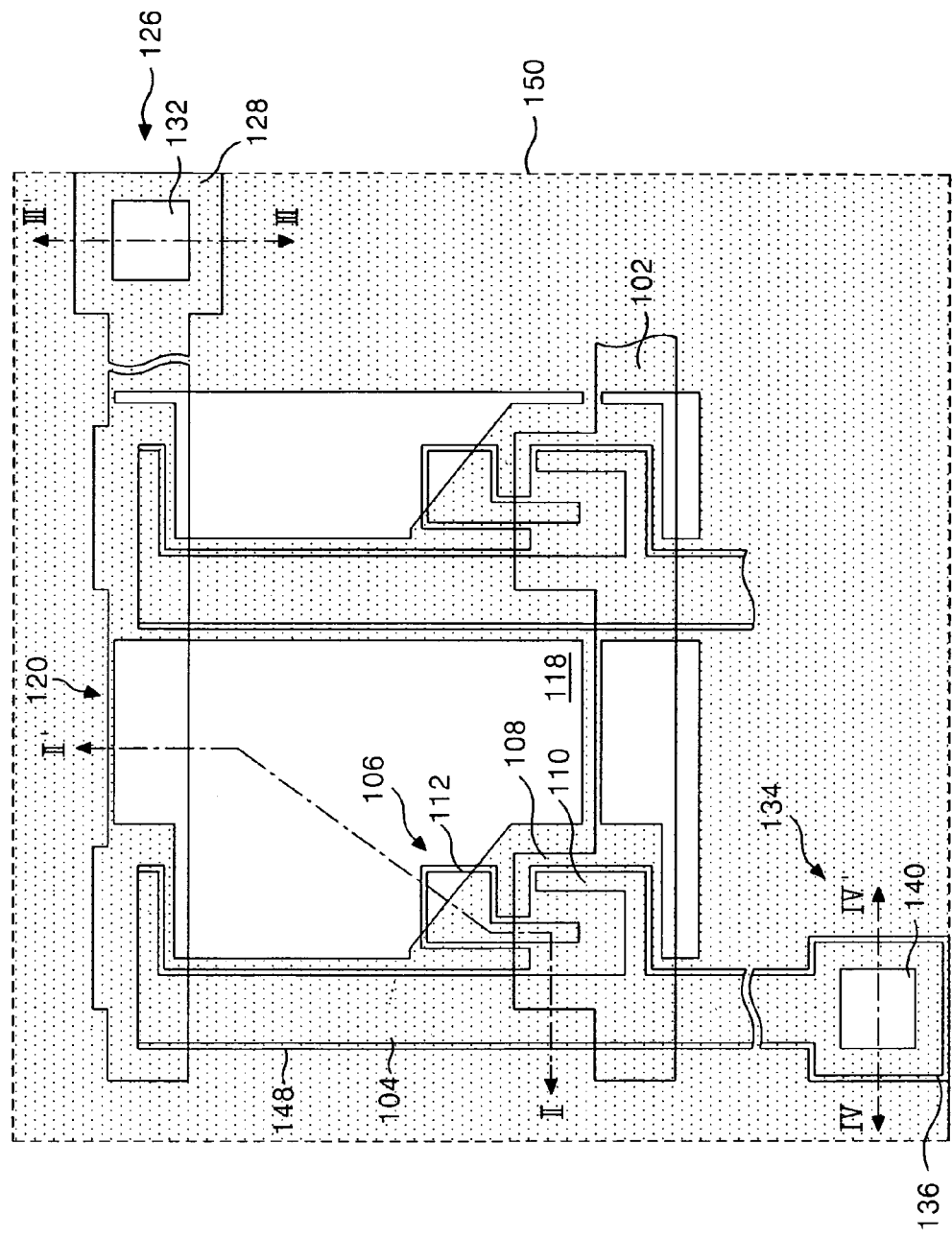
FIG. 2 is a plan view illustrating part of a thin film transistor substrate according to a first embodiment of the present invention.
Figure 3:
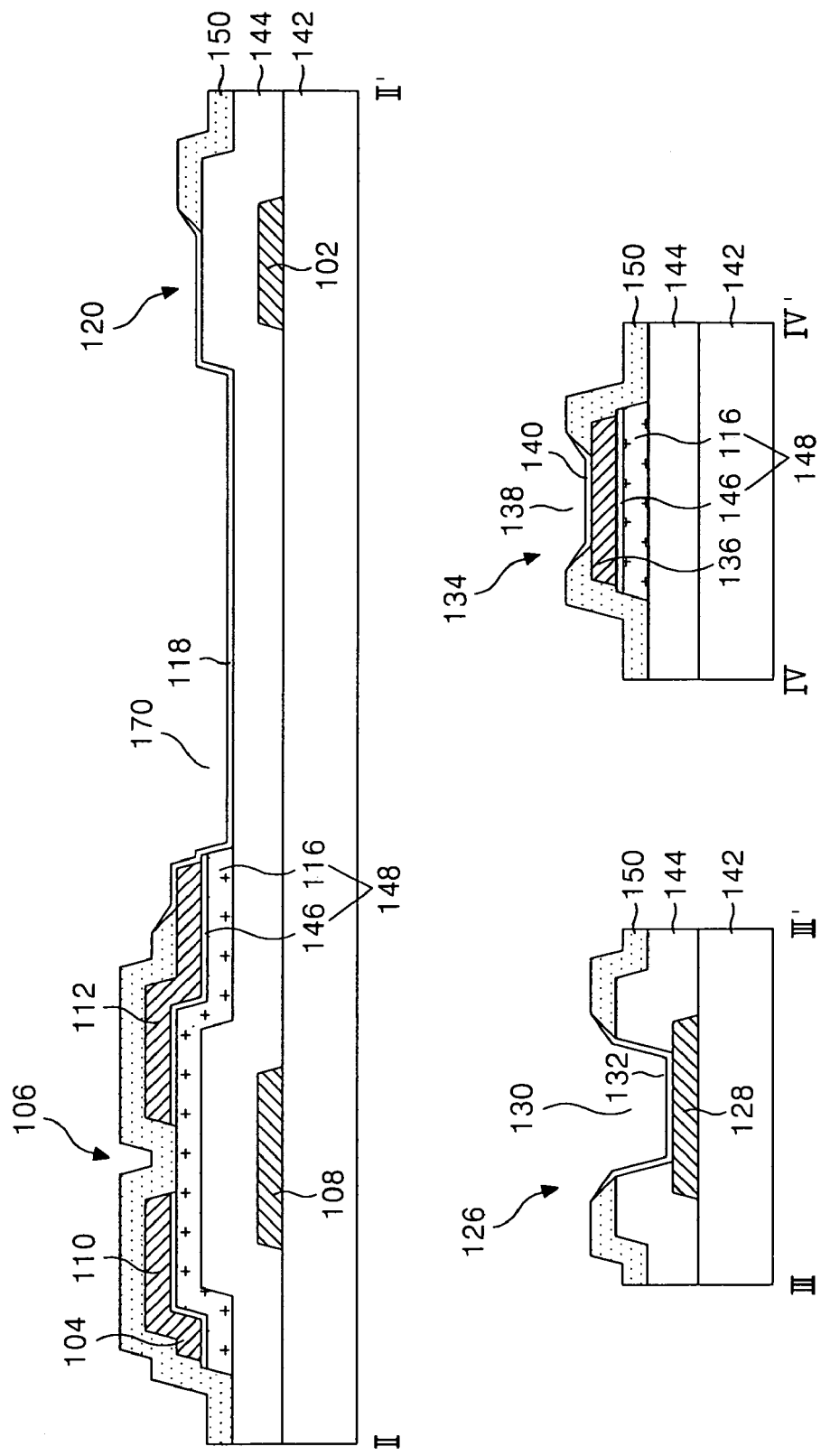
FIG. 3 is a sectional diagram illustrating the thin film transistor substrate shown in FIG. 2, taken along the lines II-II', III-III', IV-IV'.

FIG. 2 is a plan view illustrating a thin film transistor substrate according to a first embodiment of the present invention, and FIG. 3 is a sectional diagram illustrating the thin film transistor substrate shown in FIG. 2, taken along the lines II-II', III-III', IV-IV'.

The thin film transistor substrate shown in FIGS. 2 and 3 includes a gate line 102 and a data line 104 crossing each other with a gate insulating film 144 therebetween; a thin film transistor 106 located near the crossing part; and a pixel electrode 118 in a pixel area which is defined by the crossing structure. The thin film transistor substrate further includes a storage capacitor 120 including the overlapping of the pixel electrode 118 and the gate line 102; a gate pad 126 connected to the gate line 102; and a data pad 134 connected to the data line 104.

The thin film transistor 106 charges a voltage supplied on the data line 104 onto the pixel electrode and stores the voltage on the pixel electrode 118 in response to a scan signal supplied to the gate line 102. The thin film transistor 106 includes: a gate electrode 108 connected to the gate line 102; a source electrode 10 connected to the data line 104; a drain electrode 112 that faces the source electrode 10 and connects to the pixel electrode 118; an active layer 116 that overlaps the gate electrode 108 with a gate insulating film 144 therebetween to form a channel between the source electrode 110 and the drain electrode 112; and an ohmic contact layer 146 on the active layer 116 except for a channel area to be in ohmic-contact with the source electrode 110 and the drain electrode 112.

A semiconductor pattern 148 having the active layer 116 and the ohmic contact layer 146 overlaps the data line 104.

A pixel hole 170 penetrating a passivation film 150 is formed in the pixel area that is defined by the crossing of the gate line 102 and the data line 104. The pixel electrode 118 is formed on the gate insulating film 144 inside the pixel hole 170 to connect to the exposed drain electrode 112. The pixel electrode 118 is charged with the pixel signal supplied from the thin film transistor 106 to generate a potential difference with a common electrode that is formed on the color filter substrate (not shown). The potential difference causes a liquid crystal located between the thin film transistor substrate and the color filter substrate to rotate by dielectric anisotropy, thereby controlling the amount of light from a light source (not shown) transmitted through the pixel electrode 118 toward the color filter substrate.

The storage capacitor 120 is formed in a storage-on-gate structure by having the pixel electrode 118 overlap the gate line 120 with the gate insulating film 114 therebetween. Accordingly, the gap between the pixel electrode 118 and the gate line 102 is decreased to increase the capacity of the storage capacitor 120. The storage capacitor 120 stably stores the pixel signal on the pixel electrode 118.

The gate line 102 is connected to a gate driver (not shown) through the gate pad 126. The gate pad 126 includes a gate pad lower electrode 128 extending from the gate line 102; and a gate pad upper electrode 132 that is formed inside a first contact hole 130, that penetrates the passivation film 150 and the gate insulating film 144 and that connects to the gate pad lower electrode 128.

The data line 104 connects to a data driver (not shown) through the data pad 134. The data pad 134 includes a data pad lower electrode 136 extending from the data line 104, and a data pad upper electrode 140 that is formed inside a second contact hole 138, that penetrates the passivation film 150 and that connects to the data pad lower electrode 136. The semiconductor layer 148 with the ohmic contact layer 146 and the active layer 116 overlaps under the data pad lower electrode 136.

A transparent conductive pattern including the pixel electrode 118, the gate pad upper electrode 132, and the data pad upper electrode 140 is formed to have a border with the side surface of the passivation film 150 in the thin film transistor substrate. Because the side surface of the passivation film 150 has a relatively gentle tilt angle, a transparent conductive pattern is deposited and remains thereon. Accordingly, it is possible to prevent a problem where a metal layer under the passivation film 150 and the transparent conductive pattern is exposed between the passivation film 150 and the transparent conductive pattern. Further, the pixel electrode 118 is formed on the gate insulating film 144 to reduce a step difference, thus it is possible to prevent a rubbing defect caused by the step difference of the pixel electrode 118.

The liquid crystal display device according to the first embodiment of the present invention is formed using three mask processes as follows.

Figure 4A:
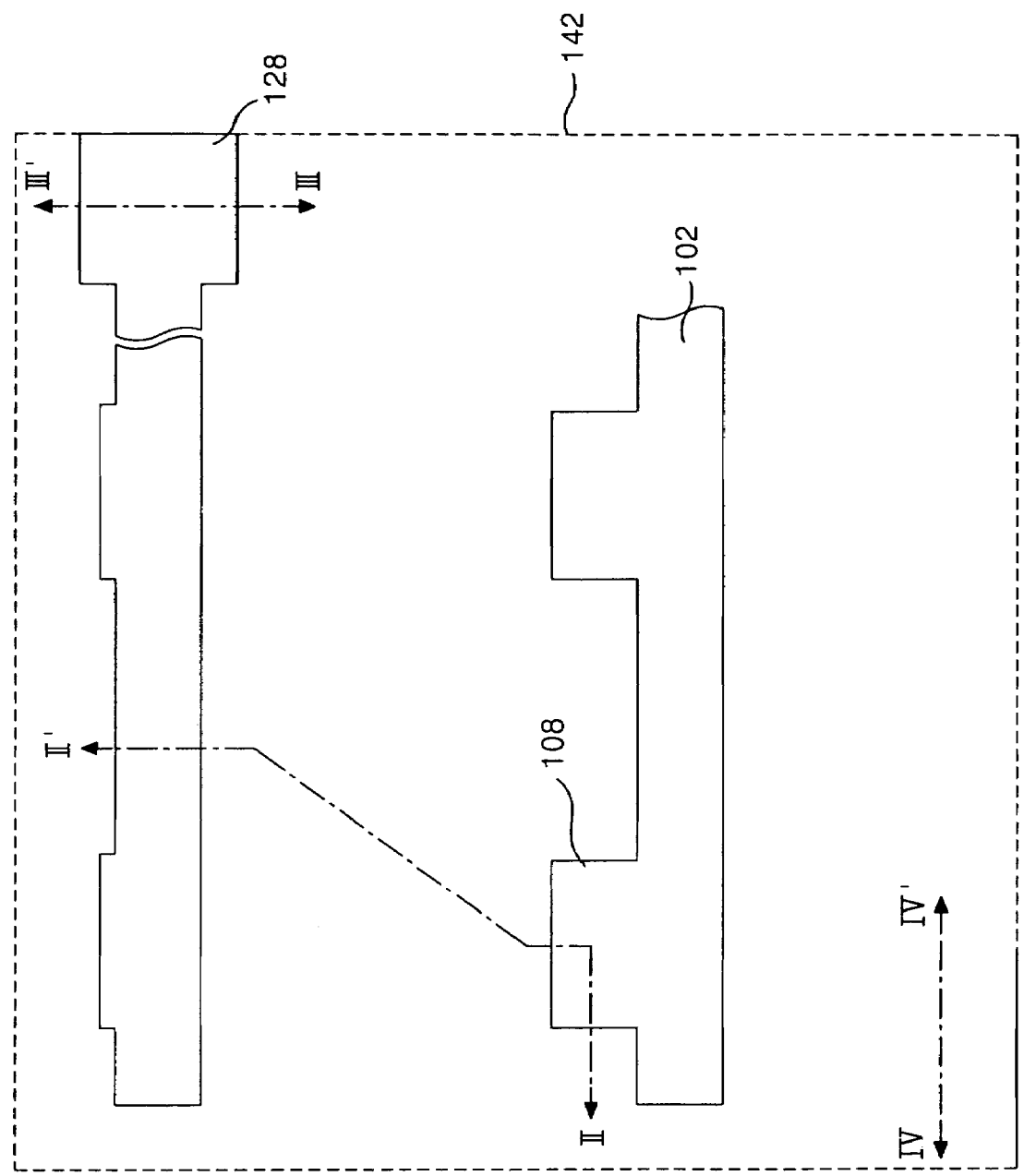

FIGS. 4A and 4B illustrate a plan view and a sectional diagram showing a first mask process in a fabricating method of a thin film transistor according to the first embodiment of the present invention.

A gate metal pattern having the gate line 102, the gate electrode connected to the gate line 102, and the gate pad lower electrode 128 is formed on the lower substrate by the first mask process.

Specifically, a gate metal layer is formed on the lower substrate 142 by a deposition method such as sputtering. The gate metal layer may be formed of Mo, Ti, Cu, AlNd, Al, Cr, Mo alloy, Cu alloy and Al alloy in a single layer, or may be formed in a double or more layer structure like Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy and Mo/Al alloy. Subsequently, the gate metal layer is patterned by a photolithography process and an etching process using a first mask, thereby forming the gate metal pattern having the gate line 102, the gate electrode 108, and the gate pad lower electrode 128.

Figure 5A:
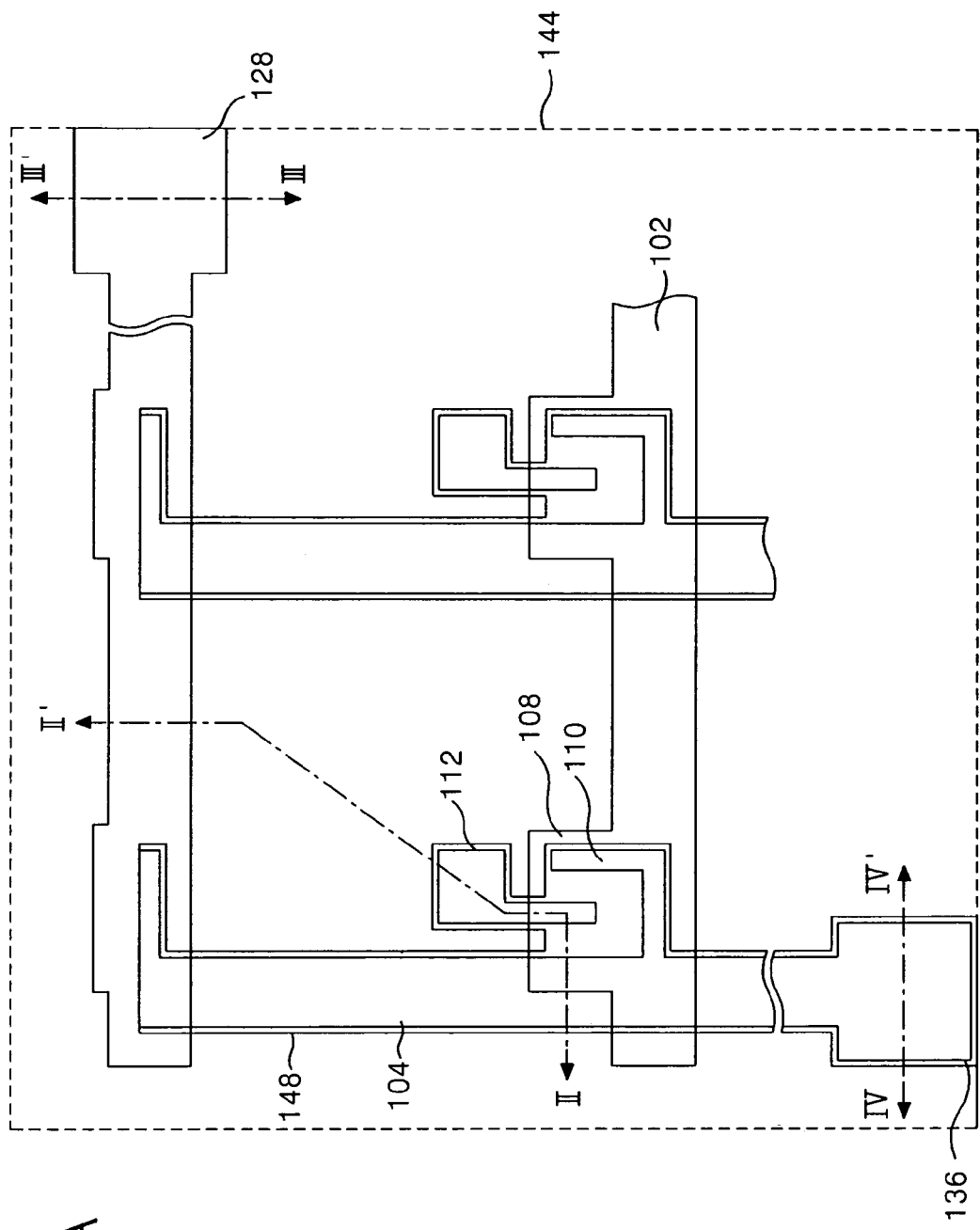

FIGS. 5A and 5B illustrate a plan view and a sectional diagram showing a second mask process in the fabricating method of the thin film transistor according to the first embodiment of the present invention, and FIGS. 6A and 6E illustrate sectional diagrams for explaining the second mask process.

The gate insulating film 144 is formed on the lower substrate 142 where the gate metal pattern is formed. A source/drain metal pattern, is formed including the data line 104, the source electrode 110, the drain electrode 112, and the data pad lower electrode 136; and a semiconductor pattern 148, is formed including the active layer 116 and the ohmic contact layer 146 that overlap along and under the source/drain metal pattern. The semiconductor pattern 148 and the source/drain pattern are formed by one mask process using a diffractive exposure mask or a halftone mask. Hereinafter, use of the diffractive exposure mask is only provided as an example for explanation.

Referring to FIG. 6A, the gate insulating film 144, an amorphous silicon layer 115, an amorphous silicon layer 145 doped with impurities (n+ or p+), and a source/drain metal layer 105 are sequentially formed on the lower substrate 142 where the gate pattern is formed. For example, the gate insulating film 144, the amorphous silicon layer 115, and the amorphous silicon layer 145 doped with the impurities are formed by a PECVD method, and the source/drain metal layer 105 is formed by a sputtering method. The gate insulating film 144 may be formed of an inorganic insulating material such as silicon oxide SiOx or silicon nitride SiNx. The source/drain metal layer 105 may be formed of a metal material such as Mo, Ti, Cu, AlNd, Al, Cr, Mo alloy, Cu alloy and Al alloy in a single layer, or is formed in a double or more layer structure like Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy and Mo/Al alloy. After a photo-resist is formed over the source/drain metal layer 105, the photo-resist 219 is exposed and developed by the photolithography process using a diffractive exposure mask 210, thereby forming a photo-resist pattern 220 with a step difference, as shown in FIG. 6B.

Specifically, as shown in FIG. 6A, the diffractive exposure mask 210 includes a transparent quartz substrate 212, a shielding layer 214, and a diffractive exposure slit 216 that may be formed of a metal layer such as Cr and CrOx. The shielding layer 214 is located in an area including the semiconductor pattern where the source/drain pattern are to be formed to shield ultraviolet rays, thereby defining a first photo-resist pattern that remains after development, as shown in FIG. 6B. The diffractive exposure slit 216 is located in an area where the channel of the thin film transistor is to be formed to diffract the ultraviolet rays, thereby leaving a second photo-resist pattern 220B that is thinner than the first photo-resist pattern 220A, as shown in FIG. 6B, after development. A transmission area of the diffractive exposure mask 210 where only the quartz substrate 212 exists transmits all the ultraviolet rays, thereby removing the photo-resist after development, as shown in FIG. 6B.

Referring to FIG. 6C, the source/drain metal layer 105 is patterned using an etching process and the photo-resist pattern 220 with the step difference, thereby forming the source/drain metal pattern and the semiconductor pattern 148 thereunder. In this case, the source electrode 110 and the drain electrode 112 in the source/drain metal pattern have an integrated structure.

Figure 6D:
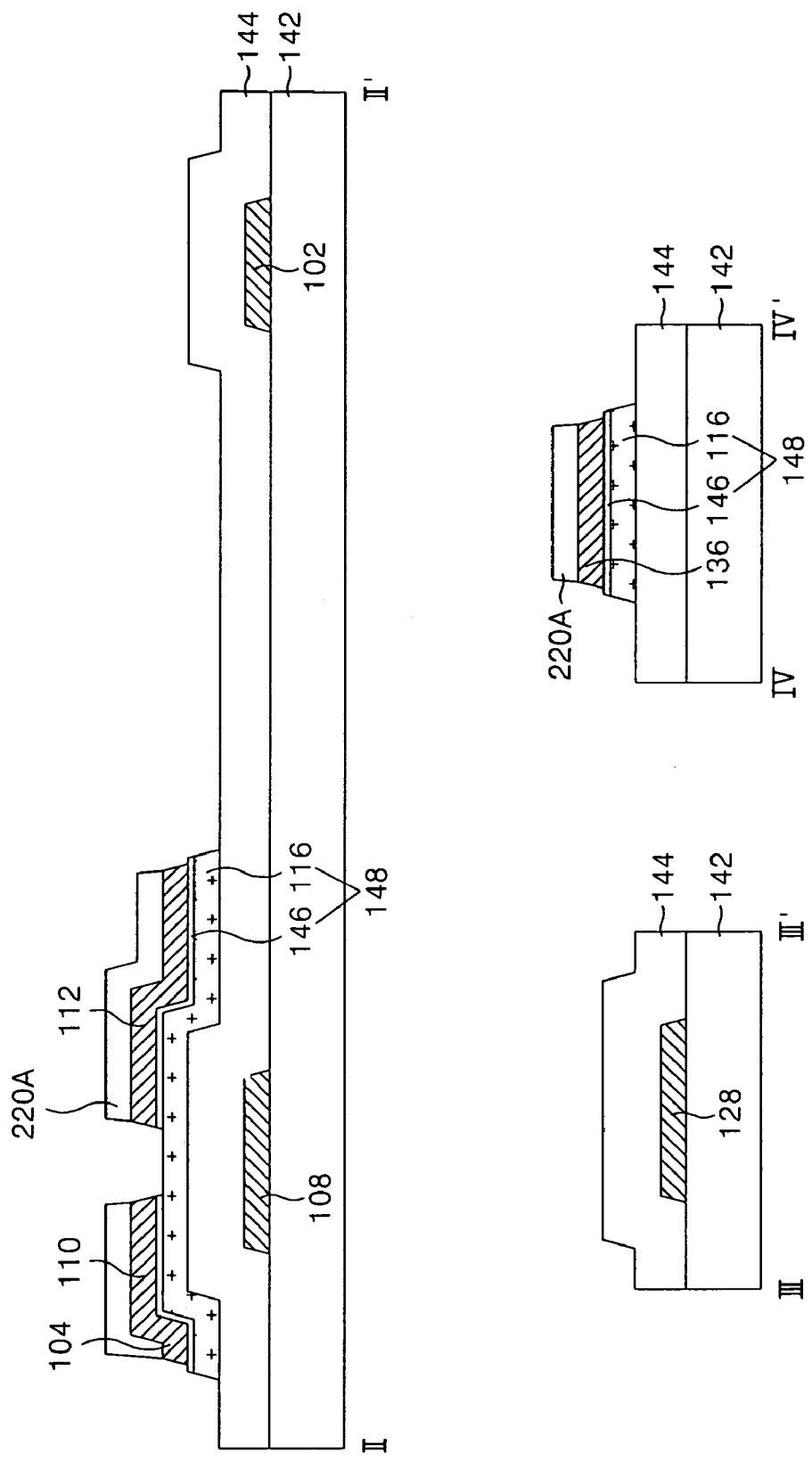
FIGS. 6A and 6E are sectional diagrams showing the second mask process of the present invention.

Referring to FIG. 6D, the photo-resist pattern 220 is ashed by an ashing process using oxygen plasma $O_2$ to thin the first photo-resist pattern 220A and to remove the second photo-resist pattern 220B. Subsequently, the exposed source/drain metal pattern and the ohmic contact layer 146 thereunder are removed by the etching process using the ashed first photo-resist pattern 220A, thereby separating the source electrode 110 from the drain electrode 112 and exposing the active layer 116. At this point, both side parts of the source/drain metal pattern are once more etched along the ashed first photo-resist pattern 220A, thereby allowing the source/drain metal pattern and the semiconductor pattern to have a fixed step difference in a step shape.

Referring to FIG. 6E, the first photo-resist pattern 220A remaining on the source/drain metal pattern in FIG. 6D is removed by a stripping process.

Figure 7A:
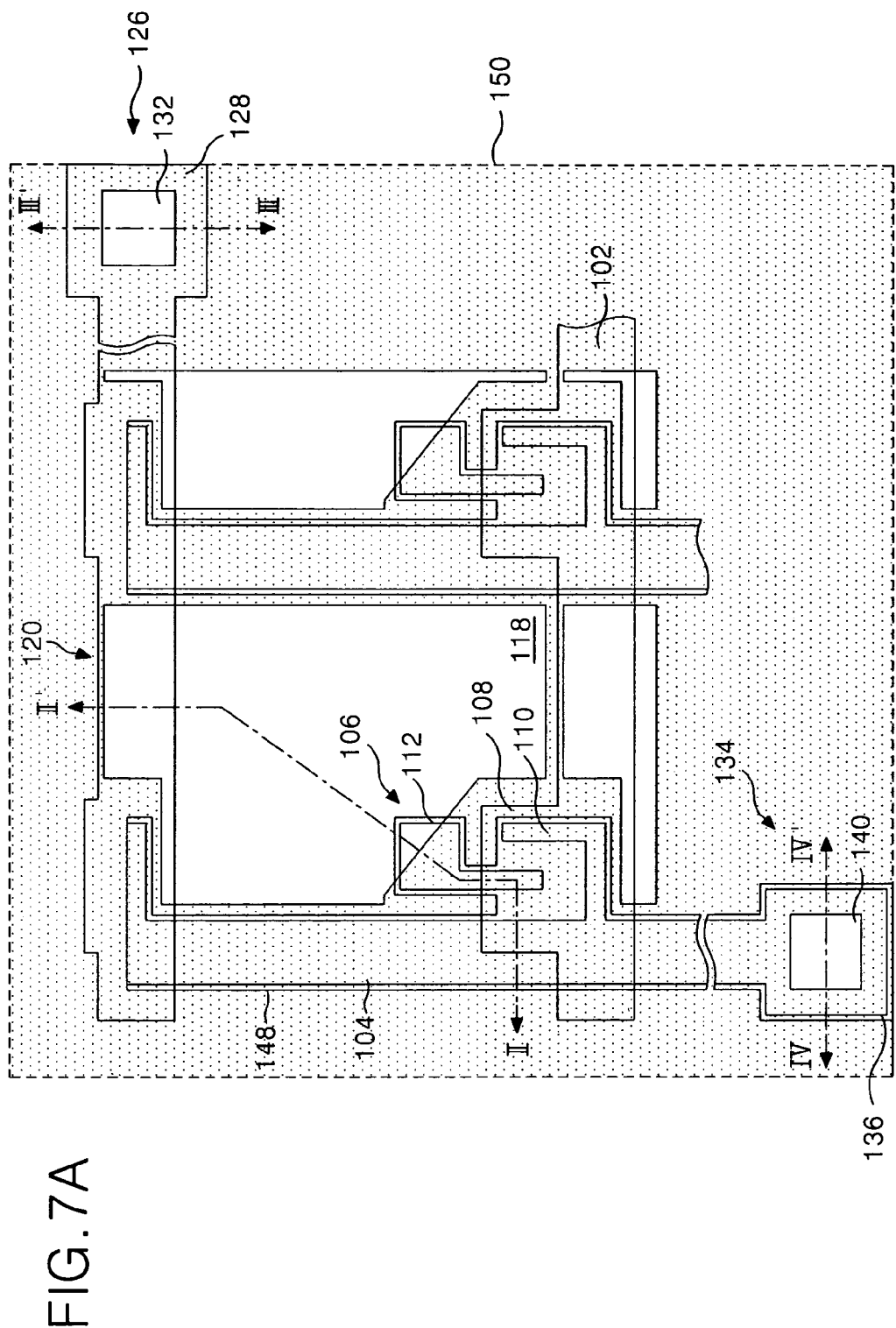

FIGS. 7A and 7B illustrate a plan view and a sectional diagram showing a third mask process in the fabrication method of the thin film transistor substrate according to the present invention, and FIGS. 8A to 8F illustrate sectional diagrams for explaining the third mask process of the present invention.

Using the third mask process, the passivation film 150 having the pixel hole 170 and the first and second contact holes 130, 138 is formed, and the transparent conductive pattern having the pixel electrode 118, the gate pad upper electrode 132, and the data pad upper electrode 140 is formed. Herein, the first contact hole 130 penetrates the passivation film 150 and the gate insulating film 144, but on the other hand, the pixel hole 170 and the second contact hole 138 only penetrate only the passivation film 150.

In this way, the pixel hole 170 and the first and second contact holes 130, 138 that have different depths are formed by use of the diffractive exposure mask or the halftone mask, but hereinafter only the halftone mask will be used as an example in the explanation.

Figure 8B:
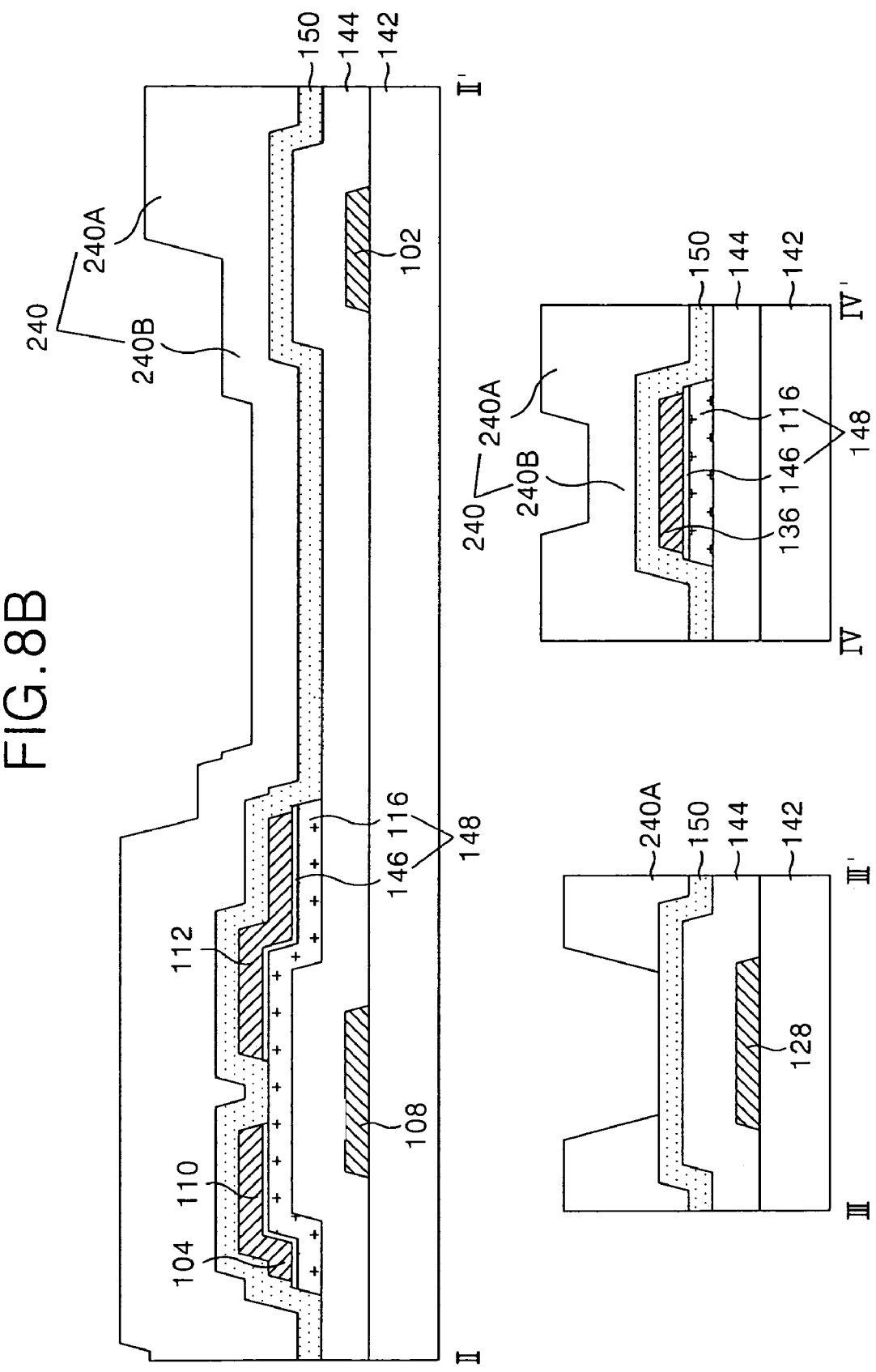
FIGS. 8A and 8F are sectional diagrams for showing the third mask process of the present invention.

Referring to FIG. 8A, the passivation film 150 may be formed by a method such as PECVD, spin coating, or spinless coating on the gate insulating film where the source/drain metal pattern is formed. The passivation film 150 is formed of an inorganic insulating material like the gate insulating film 144. Also, the passivation film 150 may be formed of an organic insulating material such as an acrylic organic compound, BCB, or PFCB. Subsequently, after a photo-resist 239 is formed over the passivation film 150, exposure and development are performed by the photolithography process using the halftone mask 230, thereby forming a photo-resist pattern 240 with the step difference, as shown in FIG. 8B.

Specifically, the halftone mask 230 includes a transparent quartz substrate 232, a partial transmission layer 236, and a shielding layer 234 which are formed thereon. The shielding layer 234 may be formed of a metal such as Cr or CrOx, and the partial transmission layer 236 may be formed of MoSix. Herein, the shielding layer 234 overlaps the partial transmission layer 236 and is located in an area where the passivation film 150 exists to shield the ultraviolet ray UV, thereby leaving the first photo-resist pattern 240A after development, as shown in FIG. 8B. The partial transmission layer 236 is located in an area where the pixel hole 170 and the second contact hole 138 penetrating the passivation film 150 are to be formed, and the partial transmission layer 236 partially transmits the ultraviolet ray UV, thereby leaving the second photo-resist pattern 240B thinner than the first photo-resist pattern 240A, as shown in FIG. 8B, after development. Only the quartz substrate 232 is located in an area where the first contact hole 130 which penetrates the passivation film 150 and the gate insulating film 144 is to be formed, and the quartz substrate 232 transmits all the ultraviolet rays, thereby removing the photo-resist 239, as shown in FIG. 8B.

Referring to FIG. 8C, the passivation film 150 and the gate insulating film 144 are etched by the etching process, e.g., a dry etching process, using the photo-resist pattern 240 with the step difference as a mask to form the first contact hole 130. The first contact hole penetrates the passivation film 150 and the gate insulating film 144 to expose the gate pad lower electrode 128.

Figure 8D:
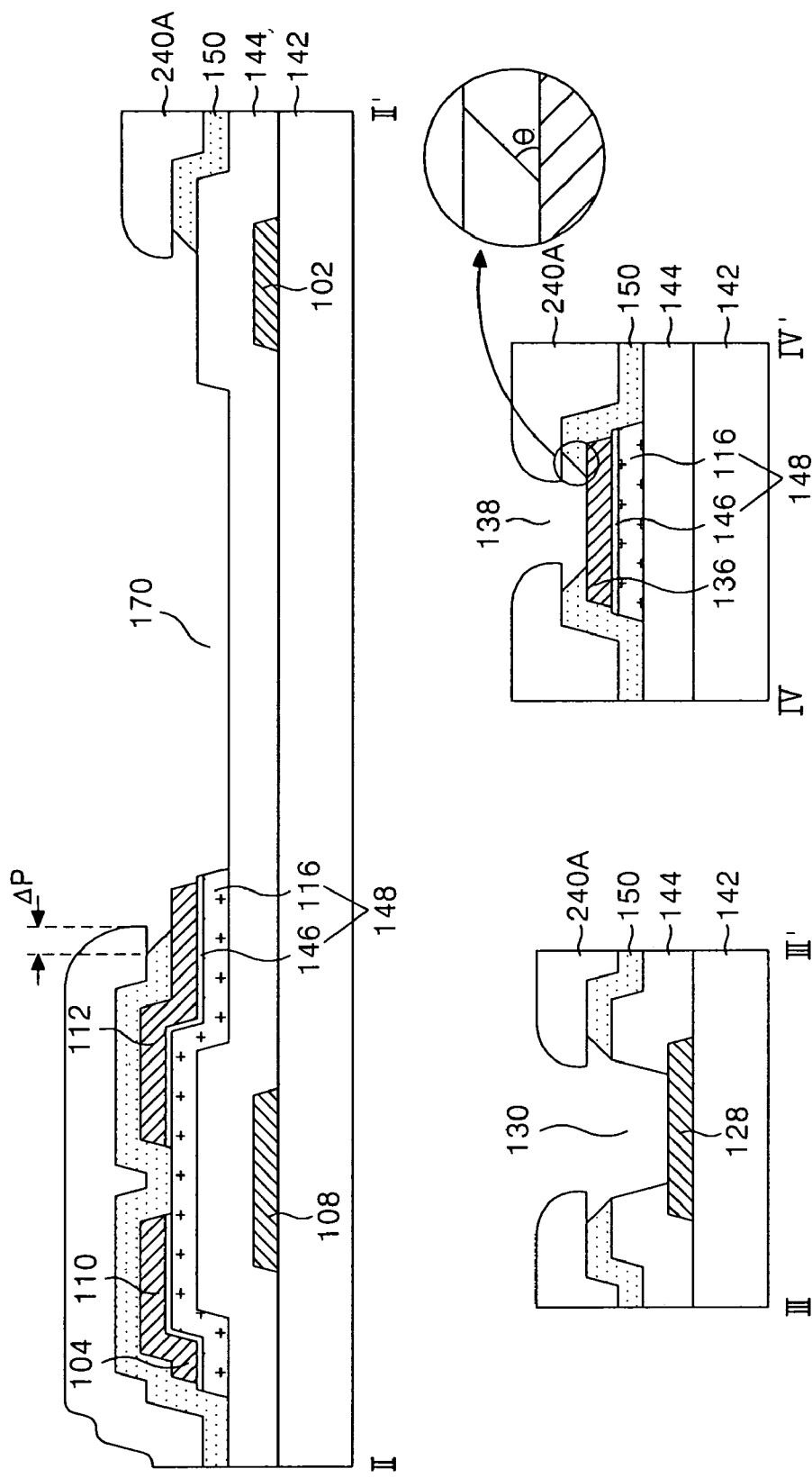

Referring to FIG. 8D, the first photo-resist pattern 240A is thinned and the second photo-resist pattern 240B is removed using the ashing process. The ashing process may take place within the same chamber as used by the dry etching process that forms the first contact hole 130. The passivation film 150 is etched by the etching process using the ashed first photo-resist pattern 240A as a mask, thereby forming the pixel hole 170 and the second contact hole 138. Specifically, the passivation film 150 may be etched by a wet etching process using an HF group and/or NH4F group etchant, for example, a buffered oxide etchant (hereinafter, referred to as "BOE"). At this point, the passivation film 150 is anisotropically etched using wet etching, thus the passivation film 150 is over-etched relative to the first photo-resist pattern 240A. The upper part of the passivation film 150 is more over-etched than its lower part in a horizontal direction by the etchant that penetrates in between the first photo-resist pattern 240A and the passivation film 150. Accordingly, the side surface of the patterned passivation film 150 tilts inward by as much as ΔP in the horizontal direction in comparison with the edge part of the first photo-resist pattern 240A, and the side surface of the passivation film 150 has a gentle tilt angle, for example, in the range of about 15°-45°. As a result, ΔP is greater than in the case of dry-etching the passivation film 150, thus it is possible to improve the efficiency of removing the first photo-resist pattern 240A. The pixel hole 170 is formed in the pixel area to expose the drain electrode 112 and the gate insulating film 144, and the second contact hole 138 exposes the data pad upper electrode 136.

Figure 8E:
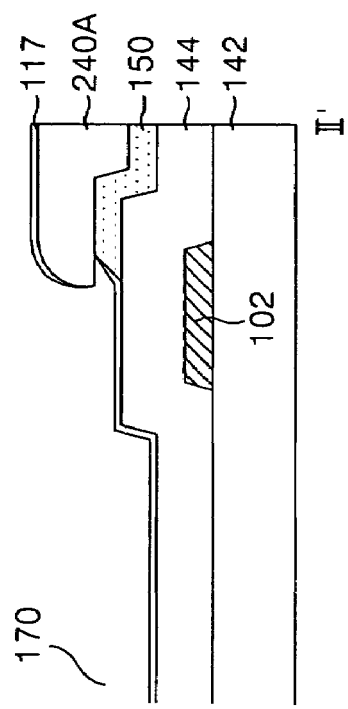
Figure 8E:
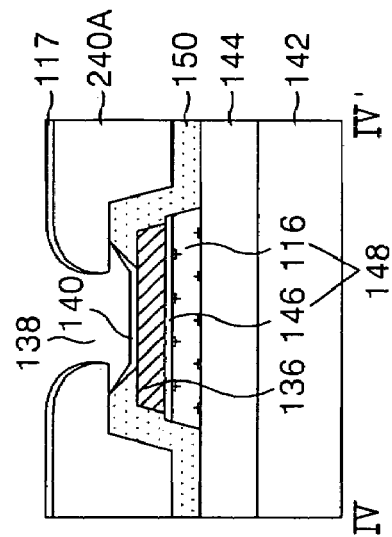
Figure 8E:
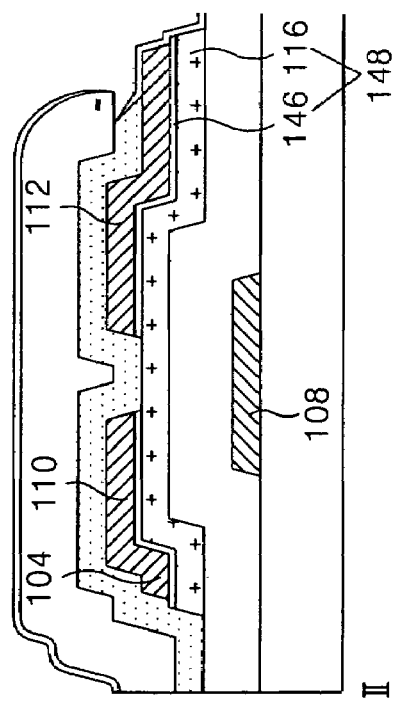
Figure 8E:
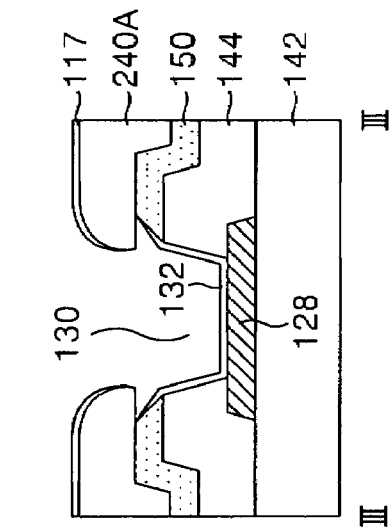
Figure 8F:
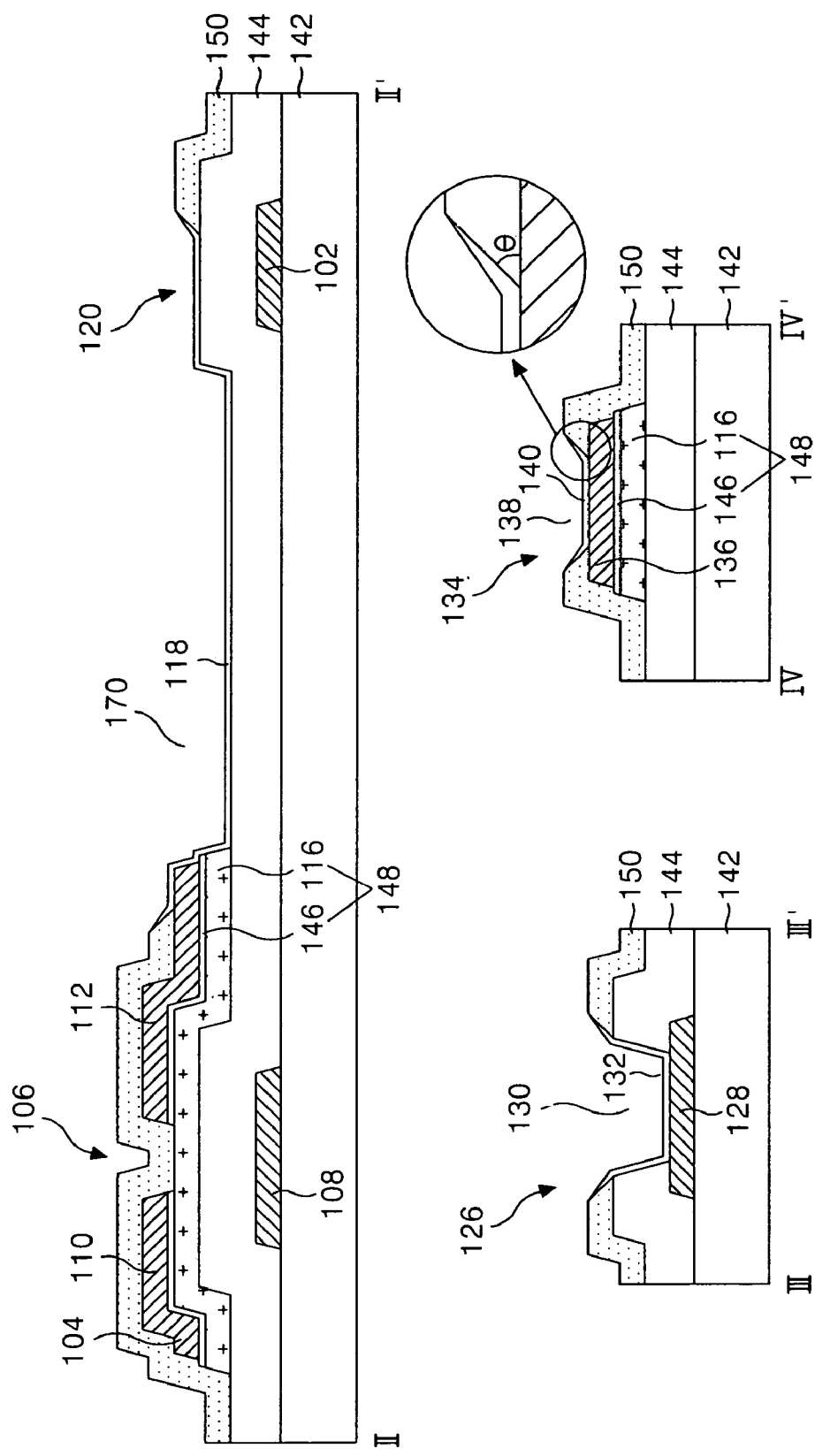

Referring to FIG. 8E, a transparent conductive film 117 is formed on the entire surface of the first photo-resist pattern 240A using a deposition method such as sputtering. The transparent conductive film 117 may be formed of ITO, TO, IZO or ITZO. Subsequently, the first photo-resist pattern 240A over which the transparent conductive film 117 is formed is removed by a lift-off process as in FIG. 8F. Accordingly, the transparent conductive film 117 is patterned, thus the transparent conductive pattern, i.e., the pixel electrode 118, the gate pad upper electrode 132, the data pad upper electrode 140 are respectively formed inside the pixel hole 170 and the first and second contact holes 130, 138.

The transparent conductive pattern is deposited even on a gentle incline plane of the passivation film 150, thus it can prevent exposing the metal layer under the transparent conductive pattern. Herein, the transparent conductive pattern has a structure such that its thickness gradually decreases as it goes up along the incline plane of the passivation film 150. Further, the transparent conductive pattern has an open structure with the transparent conductive film 117 which is deposited on the first photo-resist pattern 240, as shown in FIG. 8E, by an over-etched depth ΔP of the passivation film 150, i.e., by a separated distance ΔP between the incline plane of the passivation film 150 and the edge part of the first photo-resist pattern 240A. Accordingly, it becomes easy for a stripper to penetrate between the first photo-resist pattern 240A and the passivation film 150 in the lift-off process of removing the first photo-resist pattern 240A over which the transparent conductive film 117 is formed, thereby improving the efficiency of the lift-off. Further, the pixel electrode 118 is formed on the gate insulating film 144, thus it is possible to prevent the rubbing defect caused by the step difference and it is possible to form a storage capacitor 120 by overlapping the gate line and to improve the aperture ratio.

Figure 9:
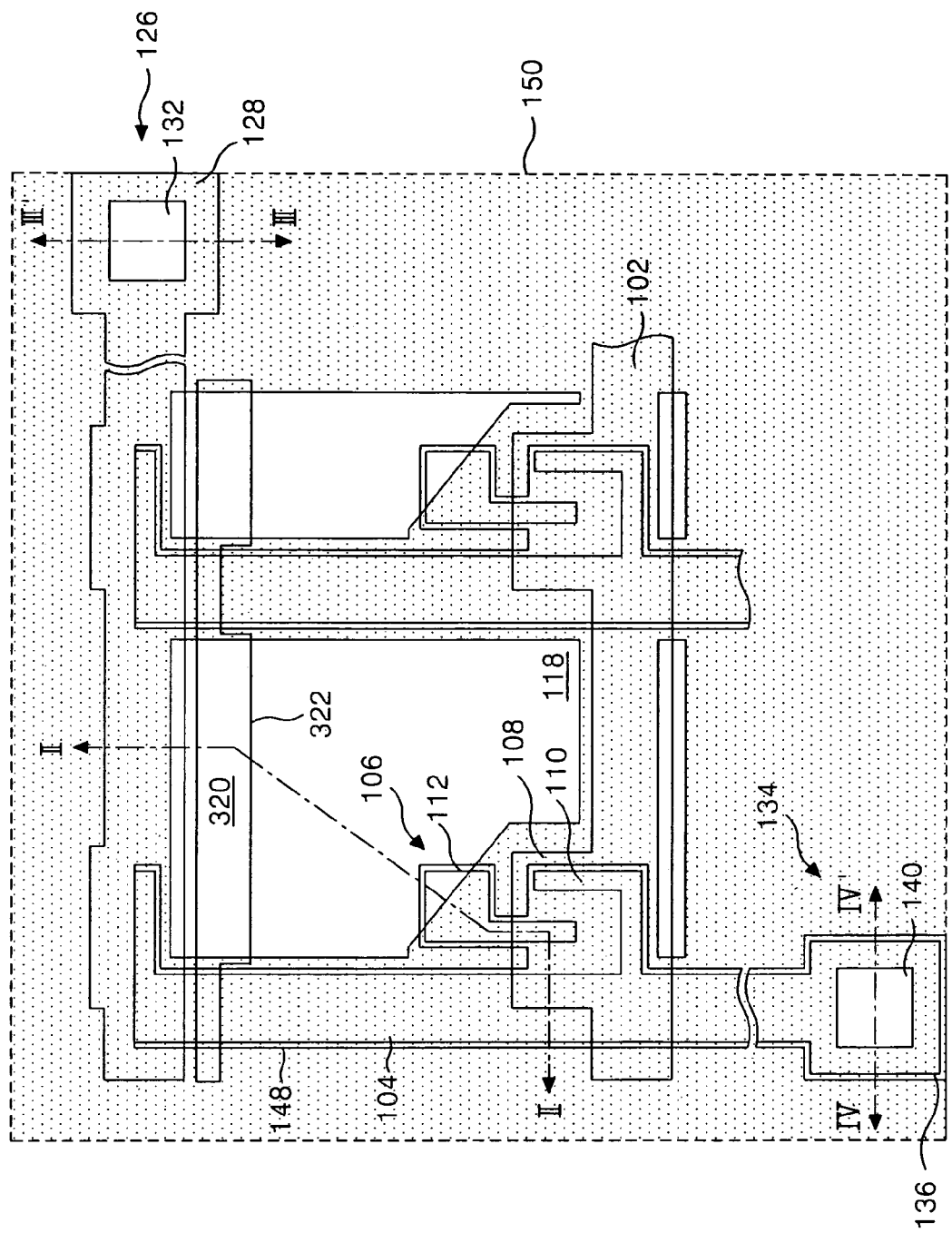
FIG. 9 is a plan view illustrating part of a thin film transistor substrate according to a second embodiment of the present invention.
Figure 10:
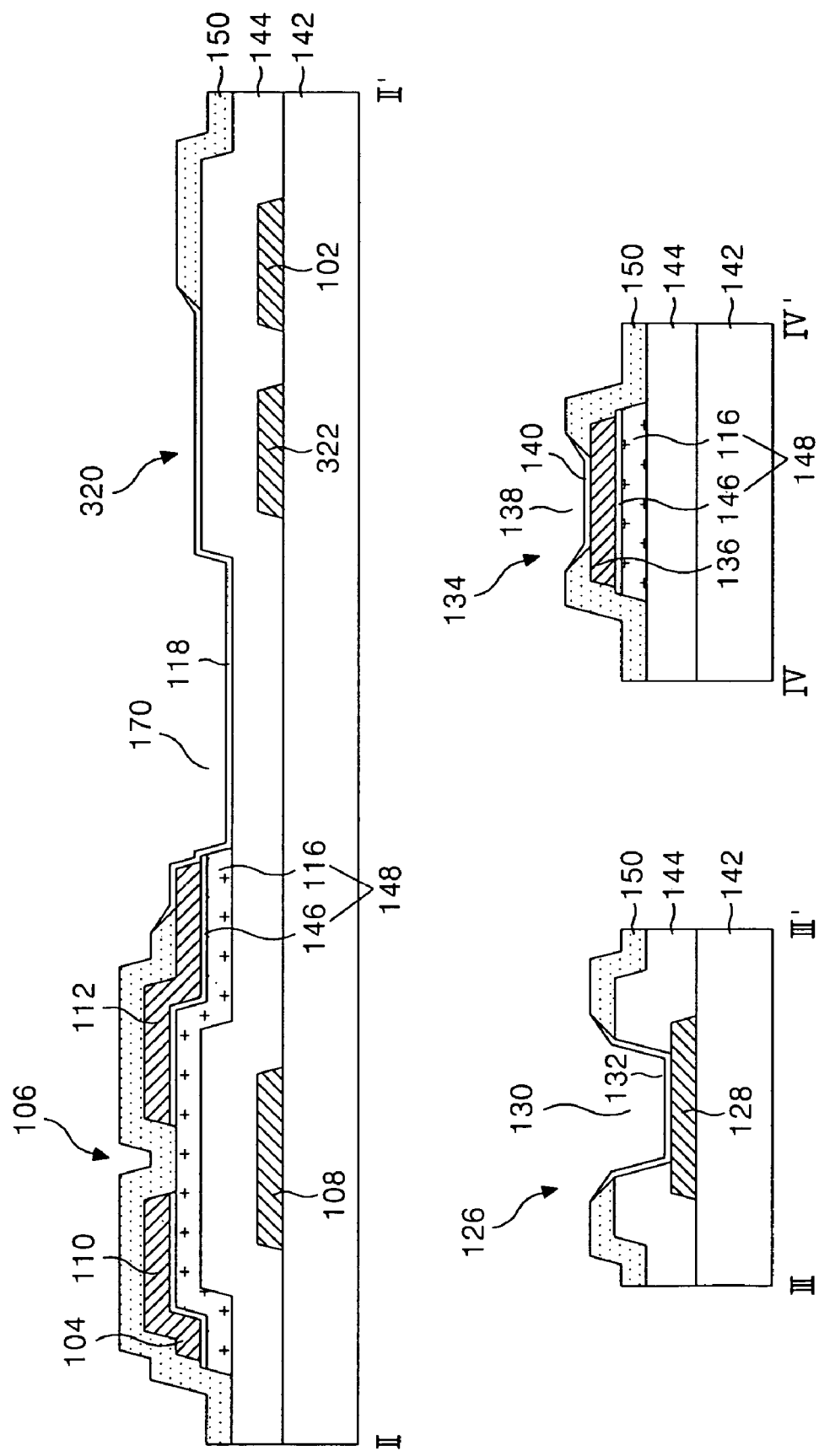
FIG. 10 is a sectional diagram illustrating the thin film transistor substrate shown in FIG. 9, taken along the lines II-II', III-III', IV-IV'.

FIG. 9 is a plan view partially illustrating a liquid crystal display device according to a second embodiment of the present invention, and FIG. 10 is a sectional diagram illustrating the thin film transistor substrate shown in FIG. 9, taken along the lines II-II', III-III', IV-IV'.

The thin film transistor substrate shown in FIGS. 9 and 10 includes the same components as the thin film transistor substrate shown in FIGS. 2 to 3 except that a storage capacitor 320 is formed using a storage-on-common structure. Accordingly, the description for the repeated components will be omitted.

The thin film transistor substrate shown in FIGS. 9 and 10 further includes a storage line 322 that is formed on a substrate 142 to be parallel to the gate line 102, i.e., to cross the pixel area. The storage line 322 is formed together with the gate line 102 in the foregoing first mask process. Accordingly, the pixel electrode 118 overlaps the storage line 322 with the gate insulating film 144 therebetween to form a storage capacitor 320 in the storage-on-common structure. The storage capacitor 320 may be formed by leaving the gate insulating film 144 when forming the pixel hole 170 in the third mask process as described above. At this moment, the pixel electrode 118 is formed not to overlap or to partially overlap the gate line 102.

As described above, the thin film transistor substrate and the fabricating method thereof according to the present invention can form the first contact hole which penetrates as far as the gate insulating film, and the pixel hole and the second contact hole which penetrate only the passivation film, by use of the halftone (or diffractive exposure) mask. The transparent conductive film is patterned by removing the photo-resist pattern used when patterning the passivation film, thereby forming the transparent conductive pattern. Accordingly, the thin film transistor substrate and the fabricating method thereof according to the present invention may simplify the process to the three mask processes.

Further, the thin film transistor substrate and the fabricating method thereof according to the present invention has the gate insulating film under the pixel electrode. Accordingly, it is possible to prevent the alignment defect caused by the step difference of the pixel electrode. Further, it is possible to form the storage capacitor using a storage-on-gate structure by the overlapping of the pixel electrode and the gate line, or to form the storage capacitor using a storage-on-common structure by the overlapping of the pixel electrode and the storage line. In addition, the pixel electrode may overlap the gate line, thus the aperture ratio of the pixel electrode may be improved.

Further, the thin film transistor substrate and the fabricating method thereof, and the thin film patterning method applied thereto according to the present invention increases the over-etched depth ΔP of the passivation film by wet-etching the passivation film, thus it is possible to improve the lift-off efficiency of the photo-resist pattern where the transparent conductive film is deposited. Further, the side surface of the patterned passivation film has a gentle incline so that the incline may be sufficiently covered by the transparent conductive pattern, thus it is possible to prevent an electrolytic corrosion problem caused by the exposure of the metal layer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   a first mask process of forming a gate line on a substrate and a gate electrode connected to the gate line;
   a second mask process of forming a gate insulating film covering the gate line and the gate electrode, a semiconductor pattern on the gate insulating film, a data line crossing the gate line on the semiconductor pattern to define a pixel area, a source electrode connected to the data line, and a drain electrode facing the source electrode; and
   a third mask process of forming a passivation film covering the data line, the source electrode and the drain electrode, and forming a pixel hole which penetrates the passivation film in the pixel area and forming a pixel electrode connected to the drain electrode in the pixel hole,
   wherein the pixel electrode formed on a side surface of the passivation film to encompass the pixel hole, to form a border with the passivation film, and having its thickness decrease as it goes up on the side surface of the passivation film, and
   wherein the third mask process further includes:
   forming a photo-resist pattern on the passivation film;
   forming a transparent conductive film covering the photo-resist pattern; and
   removing a photo-resist pattern where the transparent conductive film is formed.

2. The method according to claim 1,
   wherein forming the pixel hole includes forming the pixel hole by wet-etching the passivation film using the photo-resist pattern as a mask, and
   forming the photo-resist pattern includes forming the pixel electrode separated from the transparent conductive film in the pixel hole.

3. The method according to claim 1, wherein the third mask process further includes:
   forming a storage capacitor by overlapping the pixel electrode with the gate line with the gate insulating film therebetween.

4. The method according to claim 1, wherein the first mask process further includes:
   forming a storage line substantially parallel to the gate line on the substrate, and
   wherein the third mask process further includes:
   forming a storage capacitor by overlapping the pixel electrode with the storage line with the gate insulating film therebetween.

5. The method according to claim 1, wherein the first mask process further includes:
   forming a gate pad lower electrode extending from the gate line, and
   wherein the third mask process further includes:
   forming a first contact hole penetrating the passivation film and the gate insulating film; and
   forming a gate pad upper electrode in the first contact hole connected to the gate pad lower electrode.

6. The method according to claim 5, wherein the second mask process further includes:
   forming a data pad lower electrode extending from the data line together with the semiconductor pattern, and
   wherein the third mask process further includes:
   forming a second contact hole penetrating the passivation film; and
   forming a data pad upper electrode in the second contact hole to be connected to the data pad lower electrode.

7. The method according to claim 6, wherein the third mask process further includes:
   forming the photo-resist pattern on the passivation film with a different thickness by a photolithography process using one of a diffractive exposure mask and a halftone mask;
   forming the pixel hole and the first and second contact holes using an etching process and the photo-resist pattern with the different thickness as a mask;
   forming the transparent conductive film covering the photo-resist pattern, and forming the pixel electrode, the gate pad upper electrode and the data pad upper electrode, which are separated from the transparent conductive film, in the pixel hole and the first and second contact holes; and removing the photo-resist pattern over which the transparent conductive film is formed.

8. The method according to claim 7, wherein the passivation film where the pixel hole and the first and second contact holes are formed is over-etched versus the photo-resist pattern.

9. The method according to claim 7, wherein the side surface of the passivation film where the pixel hole and the first and second contact holes are formed is over-etched in a horizontal direction beyond an edge of the photo-resist pattern.

10. The method according to claim 7, wherein forming the pixel hole and the first and second contact holes includes:

forming the first contact hole by a first etching process using the photo-resist pattern as a mask; and forming the pixel hole and the second contact hole by a second etching process using the photo-resist pattern as a mask.

11. The method according to claim 10, wherein dry etching is used in the first etching process and a wet etching is used in the second etching process.

12. The method according to claim 10, wherein the side surface of the passivation film where the pixel hole and the first and second contact holes are formed has a gentle tilt angle.

13. The method according to claim 12, wherein the side surface of the passivation film is formed to have a tilt angle of about 15°-45°.

14. The method according to claim 7, wherein the gate pad upper electrode and the data pad upper electrode are formed as far as the side surface of the passivation film, which encompasses the corresponding contact hole, to form a border with the passivation film and the thickness of the pad upper electrode decreases as it goes up the side surface of the passivation film.

15. A method of fabricating a liquid crystal display device, comprising:

forming a gate line and a data line crossing each other with a gate insulating film therebetween to define a pixel area, and a thin film transistor connected to the gate line and the data line;

forming a passivation film on the substrate;

forming a photo-resist pattern on the passivation film;

patterning the passivation film by a wet etching using the photo-resist pattern as a mask;

forming a transparent conductive film on the substrate; and forming a pixel electrode by patterning the transparent conductive film by removing the photo-resist pattern where the transparent conductive film is formed, wherein the pixel electrode is formed on the gate insulating film and connected to the thin film transistor.

16. A method of patterning thin films, comprising:

forming a first thin film on a substrate;

forming a photo-resist pattern on the first thin film;

over-etching the exposed first thin film through the photo-resist pattern by a wet etching;

forming a second thin film covering the photo-resist pattern; and patterning the second thin film by removing the photo-resist pattern where the second thin film is formed.

17. The method according to claim 16, wherein each of the first and second thin films includes at least one of an insulating film and a conductive layer.

* * * * *